United States Patent
Chen et al.

(10) Patent No.: US 10,303,473 B2
(45) Date of Patent: May 28, 2019

(54) VECTOR PERMUTATION CIRCUIT AND VECTOR PROCESSOR

(71) Applicant: HUAWEI TECHNOLOGIES CO., LTD., Shenzhen, Guangdong (CN)

(72) Inventors: Yunbi Chen, Shanghai (CN); Kai Hu, Shanghai (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 181 days.

(21) Appl. No.: 15/280,388

(22) Filed: Sep. 29, 2016

(65) Prior Publication Data
US 2017/0090928 A1 Mar. 30, 2017

(30) Foreign Application Priority Data
Sep. 30, 2015 (CN) .......................... 2015 1 0644158

(51) Int. Cl.
*G06F 9/30* (2018.01)
*G06F 15/80* (2006.01)
*G06F 15/82* (2006.01)

(52) U.S. Cl.
CPC ...... *G06F 9/30036* (2013.01); *G06F 9/30032* (2013.01); *G06F 15/8053* (2013.01); *G06F 15/82* (2013.01)

(58) Field of Classification Search
CPC .......................... G06F 9/30036; G06F 15/8053
See application file for complete search history.

(56) References Cited

U.S. PATENT DOCUMENTS

| | | | | |
|---|---|---|---|---|
| 6,327,651 | B1 * | 12/2001 | Dubey | G06F 7/766 712/2 |
| 6,839,828 | B2 | 1/2005 | Gschwind et al. | |
| 2003/0014457 | A1 * | 1/2003 | Desai | G06F 7/57 708/520 |
| 2008/0130871 | A1 * | 6/2008 | Gemmeke | G06F 13/4217 380/28 |

(Continued)

FOREIGN PATENT DOCUMENTS

| | | |
|---|---|---|
| CN | 102109978 A | 6/2011 |
| CN | 104756069 A | 7/2015 |

OTHER PUBLICATIONS

Chinese Office Action dated Jun. 28, 2017 in corresponding Chinese Patent Application No. 201510644158.7.

*Primary Examiner* — Andrew Caldwell
*Assistant Examiner* — Michael J Metzger
(74) *Attorney, Agent, or Firm* — Staas & Halsey LLP

(57) ABSTRACT

A vector permutation circuit and a vector processor are provided. The vector permutation circuit includes a grouping unit, m selection units connected to the grouping unit, j switching units connected to the m selection units, and a control unit connected to each selection unit and each switching unit, where each switching unit is connected to m/j selection units; the grouping unit divides to-be-permutated vector data into n vector data groups and output the n vector data groups to the m selection units; under control of the control unit, each selection unit selects a second vector data group from an input first vector data group, and outputs the second vector data group to a switching unit connected to the selection unit; under control of the control unit, each switching unit switches and outputs elements in the input second vector data group.

15 Claims, 8 Drawing Sheets

(56) References Cited

U.S. PATENT DOCUMENTS

| | | | |
|---|---|---|---|
| 2009/0150648 A1* | 6/2009 | Mejdrich | G06F 9/30032 712/4 |
| 2013/0227249 A1* | 8/2013 | Barowski | G06F 15/803 712/22 |
| 2015/0124910 A1 | 5/2015 | Van Kampen | |

\* cited by examiner

VECTOR PERMUTATION CIRCUIT AND VECTOR PROCESSOR

CROSS-REFERENCE TO RELATED APPLICATIONS

This application claims the benefit of priority to Chinese Patent Application No. 201510644158.7, filed on Sep. 30, 2015, which is hereby incorporated by reference in its entirety.

TECHNICAL FIELD

Embodiments of the present invention relate to the field of computer technologies, and in particular, to a vector permutation circuit and a vector processor.

BACKGROUND

A single-instruction multiple-data stream (English: single instruction multiple data, acronym: SIMD) technology is a technology of using one controller to control multiple processors and performing a same operation on each element in a group of data (also referred to as "vector data") to implement spatial parallelism. SIMD units that support the SIMD technology are widely integrated in some existing high-performance vector processors. In multimedia data, graphic data, and digital signal processing application, to maximally enhance parallel processing efficiency of data, an SIMD unit needs to have a function of permutating vector data.

In the prior art, the SIMD unit generally permutates the vector data by using a crossbar (English: crossbar). For example, FIG. 1 shows a schematic structural diagram of an 8×8 all-route crossbar. In FIG. 1, each line of element at an output end may come from any line of element at an input end. Therefore, input elements can be permutated in any form by using the all-route crossbar together with control logic of a controller. Because crossbar implementation logic is extremely complex and implementation of one crossbar generally requires plenty of wires and a wide area, a bit width (that is, a quantity of elements that can be permutated in parallel in a crossbar) of vector data, which can be supported by a crossbar used by a permutation unit in an existing vector processor, is only 32×8 bits=256 bits. In addition, to reduce the wires of the crossbar and the area occupied by the crossbar, a customized transistor-level circuit is generally used to implement the crossbar so as to obtain a relatively normalized topology structure.

However, as the bit width of the vector data to be permutated continuously increases, the implementation of the crossbar becomes more complex. That is, more wires and a wider area may be required. Consequently, the crossbar can hardly be implemented even if the customized transistor-level circuit is used. Therefore, the crossbar is hardly applicable in a scenario of permutating vector data that has a relatively great bit width.

SUMMARY

Embodiments of the present invention provide a vector permutation circuit and a vector processor so that a crossbar can be applied to a scenario of permutating vector data that has a relatively great bit width.

According to a first aspect, an embodiment of the present invention provides a vector permutation circuit, where the vector permutation circuit includes a grouping unit, m selection units connected to the grouping unit, j switching units connected to the m selection units, and a control unit connected to each selection unit and each switching unit, where each switching unit is connected to m/j selection units, m, j, and n are all integers greater than 1, and m is an integer multiple of j and n;

the grouping unit is configured to divide to-be-permutated vector data into n vector data groups, and output the n vector data groups to the m selection units, where each vector data group corresponds to at least one selection unit, and the selection units respectively corresponding to different vector data groups are different;

each selection unit is configured to: under control of the control unit, select a second vector data group from a first vector data group that is input into the selection unit, and output the second vector data group to a switching unit connected to the selection unit, where the first vector data group is a vector data group in the n vector data groups;

each switching unit is configured to: under control of the control unit, switch and output elements in the second vector data group that is input into the switching unit; and the control unit is configured to control each selection unit to select the second vector data group from the first vector data that is input into the selection unit, and control each switching unit to switch the elements in the second vector data group that is input into the switching unit.

With reference to the first aspect, in a first possible implementation manner of the first aspect, each selection unit includes f 1-of-x selectors that are separately controlled by the control unit, x=y/n, y is a bit width of the to-be-permutated vector data, both f and x are integers greater than 1, and m*f is an integer multiple of y, where each of the f 1-of-x selectors is configured to: under control of the control unit, select an element from the first vector data group that is input into the 1-of-x selector, and output the element to a switching unit connected to the 1-of-x selector.

With reference to the first possible implementation manner of the first aspect, in a second possible implementation manner of the first aspect, each switching unit includes k 1-of-n selectors that are separately controlled by the control unit, each of the k 1-of-n selectors is connected to m/j 1-of-x selectors, the m/j 1-of-x selectors are 1-of-x selectors in the m/j selection units connected to the switching unit, and k*j is an integer multiple of y, where each of the k 1-of-n selectors is configured to: under control of the control unit, select an element from n elements that are input into the 1-of-n selector, and output the element.

With reference to the first aspect or either implementation manner of the first possible implementation manner to the second possible implementation manner of the first aspect, in a third possible implementation manner of the first aspect, m=2n, and each vector data group corresponds to two selection units.

With reference to the first aspect or either implementation manner of the first possible implementation manner to the second possible implementation manner of the first aspect, in a fourth possible implementation manner of the first aspect, m=n, and each vector data group corresponds to one selection unit.

With reference to the first possible implementation manner or the second possible implementation manner of the first aspect, in a fifth possible implementation manner of the first aspect, the control unit is specifically configured to: according to preset control logic, generate a first control signal corresponding to each 1-of-x selector, and a second control signal corresponding to each 1-of-n selector, and output the first control signal to the corresponding 1-of-x selector and output the second control signal to the corresponding 1-of-n selector;

each 1-of-x selector is specifically configured to: according to the first control signal that is input into the 1-of-x selector, select an element from the first vector data group that is input into the 1-of-x selector, and output the element to a 1-of-n selector connected to the 1-of-x selector; and each 1-of-n selector is specifically configured to: according to the second control signal that is input into the 1-of-n selector, select an element from n elements that are input into the 1-of-n selector, and output the element.

According to a second aspect, an embodiment of the present invention provides a vector processor, where the vector processor includes the vector permutation circuit according to the first aspect or any implementation manner of the first possible implementation manner to the fifth possible implementation manner of the first aspect.

The embodiments of the present invention provide a vector permutation circuit and a vector processor, where the vector permutation circuit includes a grouping unit, m selection units connected to the grouping unit, j switching units connected to the m selection units, and a control unit connected to each selection unit and each switching unit, where each switching unit is connected to m/j selection units, m, j, and n are all integers greater than 1, and m is an integer multiple of j and n; the grouping unit is configured to divide to-be-permutated vector data into n vector data groups, and output the n vector data groups to the m selection units, where each vector data group corresponds to at least one selection unit, and selection units respectively corresponding to different vector data groups are different; each selection unit is configured to: under control of the control unit, select a second vector data group from a first vector data group that is input into the selection unit, and output the second vector data group to a switching unit connected to the selection unit, where the first vector data group is a vector data group in the n vector data groups; each switching unit is configured to: under control of the control unit, switch and output elements in the second vector data group that is input into the switching unit; and the control unit is configured to control each selection unit to select the second vector data group from the first vector data that is input into the selection unit, and control each switching unit to switch the elements in the second vector data group that is input into the switching unit.

Based on the foregoing technical solution, in the embodiments of the present invention, before the selection unit makes a selection on the vector data group and the switching unit switches the elements in the vector data group, the to-be-permutated vector data is grouped first, that is, the to-be-permutated vector data is divided into the n vector data groups. Therefore, in the embodiments of the present invention, for vector data that has a relatively great bit width, the vector data can be converted, by grouping, into vector data that has a smaller bit width, and be permutated. In this way, the vector permutation circuit provided in the embodiments of the present invention can still be implemented by using a crossbar, so that the crossbar can be applied to a scenario of permutating the vector data that has a relatively great bit width.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
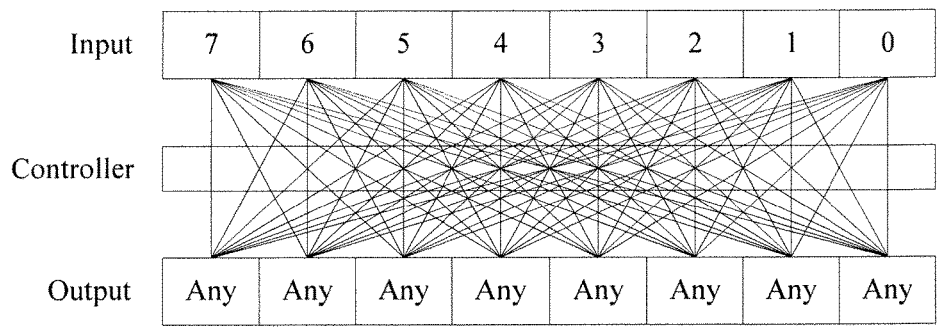
FIG. 1 is a schematic diagram of a crossbar provided in the prior art.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. For example, A/B may indicate A or B.

In the specification and claims of the present invention, the terms "first", "second", and so on are intended to distinguish between different objects but do not indicate a particular order of the objects. For example, a first vector data group, a second vector data group, and the like are intended to distinguish between different vector data groups rather than describe an order of the vector data groups.

Unless otherwise specified, "multiple" in the specification and claims herein refers to at least two. For example, multiple selectors refer to at least two selectors.

In addition, the terms "include", "comprise", and any variants thereof mentioned in descriptions of the present invention are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

In the following description, specific details such as a particular system structure, an interface, and a technology are set forth in an illustrative but not a restrictive sense to make a thorough understanding of the present invention. However, a person skilled in the art should know that the present invention may be practiced in other embodiments without these specific details. In other cases, detailed descriptions of well-known apparatuses, circuits, and methods are omitted, so that the present invention is described without being obscured by unnecessary details.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A vector permutation circuit and a vector processor that are provided in the embodiments of the present invention are generally applied to a scenario of permutating to-be-permutated vector data. Before permutating the to-be-permutated vector data, the vector permutation circuit and the vector processor that are provided in the embodiments of the present invention group the to-be-permutated vector data first, so that vector data with a relatively great bit width can be converted into vector data with a smaller bit width, and be permutated. Therefore, the vector permutation circuit and the vector processor that are provided in the embodiments of the present invention can still be implemented by using a crossbar, so that the crossbar can be applied to a scenario of permutating the vector data that has a relatively great bit width.

A quantity expressed in words in the specification and the claims herein has the same meaning as, and in any case is interchangeable with a same quantity expressed in an Arabic number. For example, "one" refers to "1", that is, "one" has the same meaning as, and in any case is interchangeable with "1"; "two" refers to "2", that is, "two" has the same meaning as, and in any case is interchangeable with "2"; and "four" refers to "4", that is, "four" has the same meaning as, and in any case is interchangeable with "4".

Figure 2:
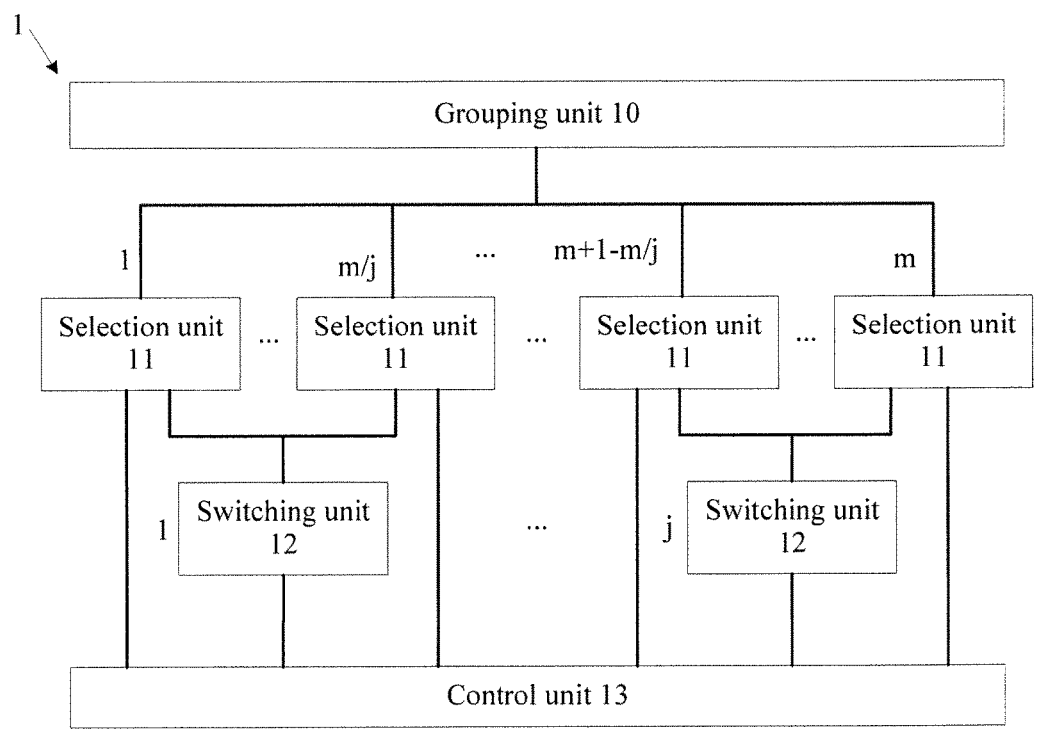
FIG. 2 is a first schematic structural diagram of a vector permutation circuit according to an embodiment of the present invention.

As shown in FIG. 2, an embodiment of the present invention provides a vector permutation circuit 1, where the vector permutation circuit 1 includes a grouping unit 10, m selection units 11 connected to the grouping unit 10, j switching units 12 connected to the m selection units 11, and a control unit 13 connected to each selection unit 11 and each switching unit 12, where each switching unit 12 is connected to m/j selection units 11, m, j, and n are all integers greater than 1, and m is an integer multiple of j and n.

The grouping unit 10 is configured to divide to-be-permutated vector data into n vector data groups, and output the n vector data groups to the m selection units 11, where each vector data group corresponds to at least one selection unit 11, and the selection units 11 respectively corresponding to different vector data groups are different.

Each selection unit 11 is configured to: under control of the control unit 13, select a second vector data group from a first vector data group that is input into the selection unit 11, and output the second vector data group to a switching unit 12 connected to the selection unit 11, where the first vector data group is a vector data group in the n vector data groups.

Each switching unit 12 is configured to: under control of the control unit 13, switch and output elements in the second vector data group that is input into the switching unit 12.

The control unit 13 is configured to control each selection unit 11 to select the second vector data group from the first vector data that is input into the selection unit 11, and control each switching unit 12 to switch the elements in the second vector data group that is input into the switching unit 12.

In this embodiment of the present invention, according to a grouping requirement in actual permutation, n may be set to an integer such as 2, 3, or 4. Assuming that n is 2, the vector permutation circuit in this embodiment of the present invention may divide the to-be-permutated vector data into two vector data groups, for example, into an odd-number vector data group and an even-number vector data group. Assuming that n is 4, the vector permutation circuit in this embodiment of the present invention may divide the to-be-permutated vector data into four vector data groups, for example, a vector data group 1, a vector data group 2, a vector data group 3, and a vector data group 4, which is not specifically limited by the present invention.

Exemplarily, it is assumed that the to-be-permutated vector data is denoted by $\{S_{63}, S_{62}, S_{61}, \ldots, S_1, S_0\}$. In the vector permutation circuit provided in this embodiment of the present invention, when n is 2, the to-be-permutated vector data may be divided into two vector data groups: an odd-number vector data group and an even-number vector data group, where the odd-number vector data group is denoted by $\{S_{63}, S_{61}, \ldots, S_3, S_1\}$, and the even-number vector data group is denoted by $\{S_{62}, S_{60}, \ldots, S_2, S_0\}$. When n is 4, the to-be-permutated vector data may be divided into four vector data groups: a vector data group 1, a vector data group 2, a vector data group 3, and a vector data group 4, where the vector data group 1 is denoted by $\{S_{15}, S_{14}, \ldots, S_1, S_0\}$, the vector data group 2 is denoted by $\{S_{31}, S_{30}, \ldots, S_{17}, S_{16}\}$, the vector data group 3 is denoted by $\{S_{47}, S_{46}, \ldots, S_{33}, S_{32}\}$, and the vector data group 4 is denoted by $\{S_{63}, S_{62}, \ldots, S_{49}, S_{48}\}$.

In this embodiment of the present invention, assuming that a bit width y of the to-be-permutated vector data is 64, that is, the to-be-permutated vector data includes 64 elements, if the to-be-permutated vector data is divided into n vector data groups, each vector data group includes y/n elements. In practical application, if y/n is not an integer, y/n may be rounded up or down. For example, if y=64 and n=3, y/n may be rounded to 21 or 22. For example, 1 vector data group in 3 vector data groups may include 22 elements, and each of the other 2 vector data groups includes 21 elements. Certainly, preferably, for ease of implementation, each of the 3 vector data groups may include 22 elements, where for the elements in the 3 vector data groups that are not enough for grouping, 0s may be added as fillers into the vector data groups.

Exemplarily, assuming that the to-be-permutated vector data $\{S_{63}, S_{62}, S_{61}, \ldots, S_1, S_0\}$ is divided into 3 groups: a vector data group 1, a vector data group 2, and a vector data group 3, the vector data group 1 may be denoted by $\{S_{20}, S_{19}, \ldots, S_1, S_0\}$, the vector data group 2 may be denoted by $\{S_{41}, S_{40}, \ldots, S_{22}, S_{21}\}$, and the vector data group 3 may be denoted by $\{S_{63}, S_{62}, \ldots, S_{43}, S_{42}\}$; or the vector data group 1 may be denoted by $\{0, S_{20}, S_{19}, \ldots, S_1, S_0\}$, the vector data group 2 may be denoted by $\{0, S_{41}, S_{40}, \ldots, S_{22}, S_{21}\}$, and the vector data group 3 may be denoted by $\{S_{63}, S_{62}, \ldots, S_{43}, S_{42}\}$.

It should be noted that the manner of grouping the to-be-permutated vector data and the quantity of groups mentioned above are merely exemplary description. The present invention includes but is not limited to the enumerated grouping manner and quantity of groups. Any other manner of grouping the to-be-permutated vector data and any other quantity of groups, which can meet an actual requirement, fall within the protection scope of the present invention.

Before a selection unit makes a selection on a vector data group and a switching unit switches elements in the vector data group, the vector permutation circuit provided in this embodiment of the present invention groups to-be-permutated vector data first, that is, divides the to-be-permutated vector data into n vector data groups. Therefore, in this embodiment of the present invention, for vector data that has a relatively great bit width, the vector data can be converted, by grouping, into vector data that has a smaller bit width, and be permutated. In this way, the vector permutation circuit provided in this embodiment of the present invention can still be implemented by using a crossbar, so that the crossbar can be applied to a scenario of permutating the vector data that has a relatively great bit width.

Optionally, the grouping unit shown in FIG. 2 may be implemented by any part capable of grouping the to-be-permutated vector data, for example, may be implemented by means of fixed wiring or by using multiple selectors, which is not specifically limited by the present invention.

In practical application, when a grouping mode (including the quantity of groups, the grouping manner, and the like, for example, division into two groups: an odd-number group and an even-number group according to serial numbers of elements) of grouping required in a scenario of applying the vector permutation circuit provided in this embodiment of the present invention is fixed and invariable, preferably, for ease of implementation, the grouping unit in this embodiment of the present invention may be implemented by means of fixed wiring. Specifically, in this embodiment of the present invention, each element in the to-be-permutated vector data may be input into each corresponding selection unit by means fixed wiring. For example, assuming that the bit width of the to-be-permutated vector data is 64, that is, the to-be-permutated vector data includes 64 elements, if the to-be-permutated vector data needs to be divided into an odd-number vector data group and an even-number vector data group according to the serial number of each element, each element with an odd-number serial number may be input into a corresponding selection unit by means of fixed wiring, and each element with an even-number serial number may be input into a corresponding selection unit by means of fixed wiring.

Further, in this embodiment of the present invention, the to-be-permutated vector data is output by a register. Therefore, fixed wiring may be set directly between each odd-number output pin of the register and a corresponding selection unit, and fixed wiring may be set between each even-number output pin of the register and a corresponding selection unit. In this way, in the to-be-permutated vector data, an element with an odd-number serial number and an element with an even-number serial number are input into different selection units respectively, so as to implement grouping of the to-be-permutated vector data. For a specific implementation manner, reference may be made to each accompanying drawing in Embodiment 1, Embodiment 2, and Embodiment 3 below, and no detailed description is given herein.

When a grouping mode (including the quantity of groups, the grouping manner, and the like, for example, division into two groups: an odd-number group and an even-number group according to serial numbers of elements) of grouping required in a scenario of applying the vector permutation circuit provided in this embodiment of the present invention is variable, the grouping unit in this embodiment of the present invention may be implemented by using multiple selectors, where selection logic of the multiple selectors are controlled by the control unit. Specifically, in this embodiment of the present invention, each element in the to-be-permutated vector data may be selected by using the multiple selectors, and each selected element is input into each corresponding selection unit. For example, assuming that the bit width of the to-be-permutated vector data is 64, that is, the to-be-permutated vector data includes 64 elements, if the to-be-permutated vector data needs to be divided into an odd-number vector data group and an even-number vector data group according to the serial number of each element, multiple selectors may select each element in the to-be-permutated vector data under control of the control unit, so as to divide the to-be-permutated vector data into an odd-number vector data group and an even-number vector data group and input each element with an even-number serial number into a corresponding selection unit. When the grouping unit is implemented by using multiple selectors, connection between the register and the multiple selectors may be set according to a specific grouping mode, and a connection principle in this case is similar to a connection principle of the fixed wiring, and is not elaborated herein.

Figure 3:
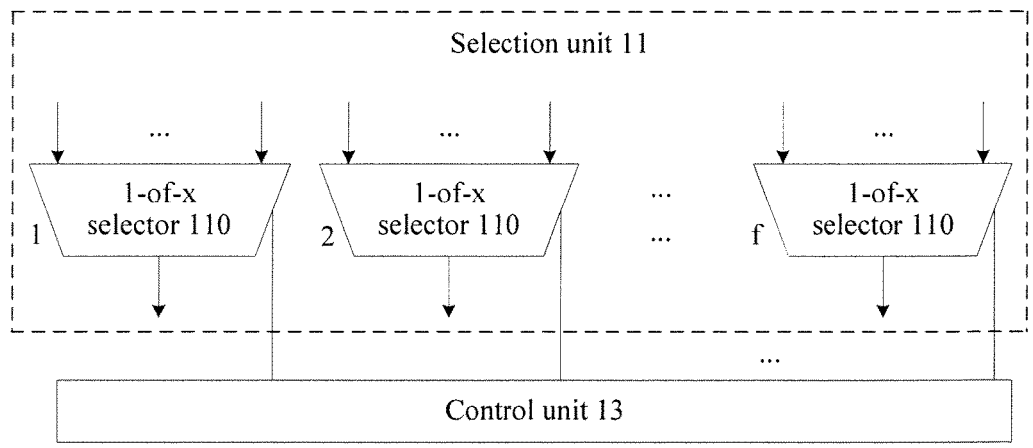
FIG. 3 is a second schematic structural diagram of a vector permutation circuit according to an embodiment of the present invention.

Optionally, as shown in FIG. 3 (because each selection unit 11 is the same, FIG. 3 shows only one selection unit 11), in this embodiment of the present invention, each selection unit 11 includes f 1-of-x selectors 110 that are separately controlled by the control unit 13, where x=y/n, y is the bit width of the to-be-permutated vector data, both f and x are integers greater than 1, and m*f is an integer multiple of y.

Each 1-of-x selector 110 in the f 1-of-x selectors 110 is configured to: under control of the control unit 13, select an element from the first vector data group that is input into the 1-of-x selector 110, and output the element to a switching unit connected to the 1-of-x selector 110.

In this embodiment of the present invention, the bit width of the to-be-permutated vector data refers to a quantity of elements that need to be permutated in parallel in the to-be-permutated vector data. Exemplarily, assuming that the bit width of the to-be-permutated vector data is 64, it may be understood as: the quantity of elements that need to be permutated in parallel in the to-be-permutated vector data is 64, that is, 64 elements need to be permutated in parallel. For example, in the to-be-permutated vector data $\{S_{63}, S_{62}, S_{61}, \ldots, S_1, S_0\}$, if the bit width of the to-be-permutated vector data is 64, it may be understood as: the quantity of elements that need to be permutated in parallel in the vector data is 64, for example, $S_{63}$-$S_0$, that is, 64 elements need to be permutated in parallel.

In the vector permutation circuit provided in this embodiment of the present invention, x=y/n may indicate that a value of x depends on a value of n and a value of y, and m*f being an integer multiple of y may indicate that a value of f depends on a value of m and the value of y. For example, assuming that y is 64, n is 2, and m is 4, x=64/2=32, and f is an integer multiple of y/m=64/4=16. Assuming that f is two times 16, that is, f=32, in this case, each selection unit includes 32 1-of-32 selectors. Assuming that y is 64 and n is 4, x=64/4=16, m is 4, and f is an integer multiple of y/m=64/4=16. Assuming that f is two times 16, that is, f=32, in this case, each selection unit includes 32 1-of-16 selectors.

Optionally, the 1-of-x selector may be a 1-of-2 selector, a 1-of-3 selector, a 1-of-4 selector, . . . , a 1-of-16 selector, . . . , a 1-of-32 selector, or the like. Using an example in which the 1-of-x selector is a 1-of-4 selector, or a 1-of-16 selector, or a 1-of-32 selector, the 1-of-4 selector may include multiple 1-of-2 selectors; both the 1-of-16 selector and the 1-of-32 selector may include multiple 1-of-2 selectors or multiple 1-of-4 selectors.

Under control of the control unit, each 1-of-x selector may make a selection in x elements (a quantity of elements in the first vector data group is y/n, that is, x) in the first vector data group that is input into the 1-of-x selector, and output a finally selected element. Therefore, x 1-of-x selectors obtain a second vector data group after separately making a selection in the x elements in the first vector data group (one 1-of-x selector selects one element, and therefore, x 1-of-x selectors select x elements). It can be understood that in this embodiment of the present invention, the second vector data group, which is obtained after the first vector data group is processed by x 1-of-x selectors, still includes x elements. However, because each 1-of-x selector makes a selection on the first vector data group, a permutation order of x elements in the second vector data group may be different from a permutation order of x elements in the first vector data group. Therefore, the to-be-permutated vector data can be permutated by using the vector permutation circuit provided in this embodiment of the present invention.

Exemplarily, assuming that the to-be-permutated vector data is $\{S_5, S_4, S_3, S_2, S_1, S_0\}$, after the to-be-permutated vector data is grouped, selected, and switched by using the vector permutation circuit provided in this embodiment of the present invention, the to-be-permutated vector data may change to $\{S_3, S_5, S_2, S_4, S_0, S_1\}$. That is, the to-be-permutated vector data can be permutated by using the vector permutation circuit provided in this embodiment of the present invention.

It should be noted that in this embodiment of the present invention, a control effect caused by the control unit on the selection unit may be determined according to preset control logic. For example, assuming that the vector data $\{S_{31}, S_{30}, \ldots, S_1, S_0\}$ needs to be permutated, the control logic of the control unit may be preset according to a desired permutation result. Exemplarily, assuming that the elements in the vector data $\{S_{31}, S_{30}, \ldots, S_1, S_0\}$ are $S_{31} > S_{30} > \ldots > S_1 > S_0$, and the specified 32 1-of-32 selectors are $A_{31}, A_{30}, \ldots, A_1$, and $A_0$ from left to right, if the elements in the vector data $\{S_{31}, S_{30}, \ldots, S_1, S_0\}$ need to be re-permutated in ascending order to obtain $\{S_0, S_1, \ldots, S_{30}, S_{31}\}$, the control logic of the control unit may be preset to: controlling $A_{31}$ to output $S_0$, controlling $A_{30}$ to output $S_1, \ldots,$ controlling $A_1$ to output $S_{30}$, and controlling $A_0$ to output $S_{31}$. In this way, by controlling the 32 1-of-32 selectors separately, the control unit causes the 32 1-of-32 selectors to finally output $\{S_0, S_1, \ldots, S_{30}, S_{31}\}$.

Figure 4:
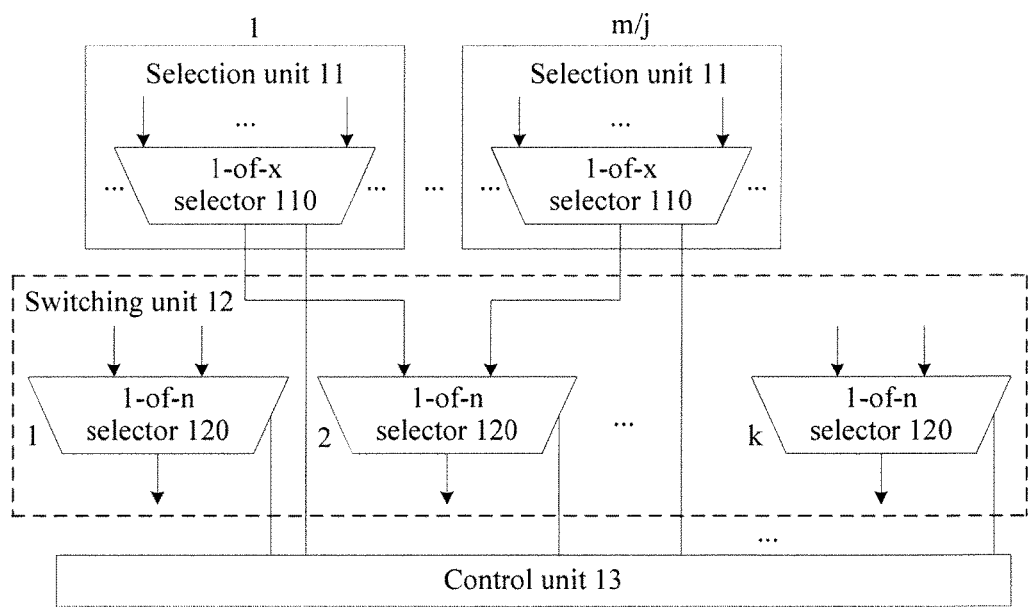
FIG. 4 is a third schematic structural diagram of a vector permutation circuit according to an embodiment of the present invention.

Optionally, as shown in FIG. 4 (because each switching unit 12 is the same, FIG. 4 shows only one switching unit 12), in this embodiment of the present invention, each switching unit 12 includes k 1-of-n selectors 120 that are separately controlled by the control unit 13. Each of the k 1-of-n selectors 120 is connected to m/j 1-of-x selectors 110, the m/j 1-of-x selectors 110 are 1-of-x selectors 110 in the m/j selection units 11 connected to the switching unit 12, and k*j is an integer multiple of y.

Each of the k 1-of-n selectors 120 is configured to: under control of the control unit 13, select an element from n elements that are input into the 1-of-n selector 120, and output the element.

It should be noted that in order to more clearly describe the vector permutation vector provided in this embodiment of the present invention, because each selection unit 11, each switching unit 12, and each 1-of-n selector 120 are connected to the m/j 1-of-x selectors 110 in a same connection manner, FIG. 3 and FIG. 4 give exemplary description by using a connection manner of connecting only one selection unit 11, one switching unit 12, and one 1-of-n selector 120 to the m/j 1-of-x selectors 110. For a connection manner of connecting another selection unit 11, another switching unit 12, and another 1-of-n selector 120 to the m/j 1-of-x selectors 110, reference may be made to FIG. 3 and FIG. 4, and no detailed description is given herein.

Optionally, in this embodiment of the present invention, the control unit is specifically configured to: according to preset control logic, generate a first control signal corresponding to each 1-of-x selector, and a second control signal corresponding to each 1-of-n selector, and output the first control signal to the corresponding 1-of-x selector and output the second control signal to the corresponding 1-of-n selector.

Each 1-of-x selector is specifically configured to: according to the first control signal that is input into the 1-of-x selector, select an element from the first vector data group that is input into the 1-of-x selector, and output the element to a 1-of-n selector connected to the 1-of-x selector.

Each 1-of-n selector is specifically configured to: according to the second control signal that is input into the 1-of-n selector, select an element from n elements that are input into the 1-of-n selector, and output the element.

Optionally, the vector permutation circuit provided in this embodiment of the present invention can implement multiple permutation modes. To more clearly describe multiple permutation modes that can be implemented by the vector permutation circuit provided in this embodiment of the present invention, the following uses three common permutation modes as examples to give detailed description on the vector permutation circuit provided in this embodiment of the present invention.

Figure 5:
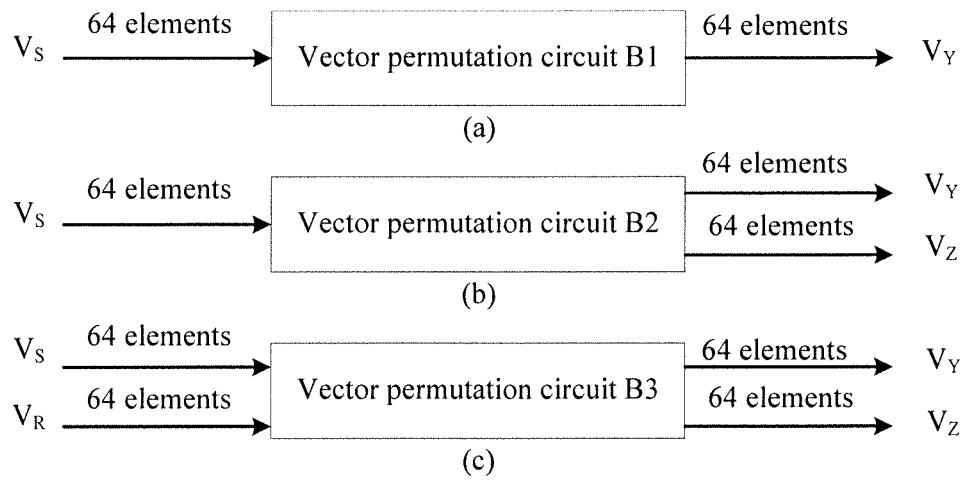
FIG. 5 is a schematic diagram of a permutation mode that can be implemented by a vector permutation circuit according to an embodiment of the present invention.

FIG. 5 shows a schematic diagram of three common permutation modes. FIG. 5(a) is a schematic diagram of a universal permutation mode. In FIG. 5(a), vector data $V_S$ is input (a bit width of $V_S$ is 64, that is, $V_S$ includes 64 elements permutated in parallel). After the vector data passes through a vector permutation circuit B1, vector data $V_Y$ is output (a bit width of $V_Y$ is 64, that is, $V_Y$ includes 64 elements, and a permutation order of elements in $V_Y$ may be different from a permutation order of elements in $V_S$), and each element in the output vector data $V_Y$ comes from an element in an arbitrary position in the input vector data $V_S$. FIG. 5(b) is a schematic diagram of a permutation mode that supports adaptive filter table lookup. In FIG. 5(b), vector data $V_S$ is input (a bit width of $V_S$ is 64, that is, $V_S$ includes 64 elements permutated in parallel). After the vector data passes through a vector permutation circuit B2, two pieces of vector data $V_Y$ and $V_Z$ are output (bit widths of both $V_Y$ and $V_Z$ are 64, that is, $V_Y$ and $V_Z$ each include 64 elements, and a permutation order of elements in $V_Y$ and $V_Z$ may be different from a permutation order of elements in $V_S$), and elements in corresponding positions in the two pieces of output vector data $V_Y$ and $V_Z$ are two adjacent elements in the input vector data $V_S$. FIG. 5(c) is a schematic diagram of a permutation mode that supports finite impulse response (English: finite impulse response, acronym: FIR) filter vector delay. In FIG. 5(c), two pieces of vector data $V_S$ and $V_R$ are input (bit widths of both $V_S$ and $V_R$ are 64, that is, $V_S$ and $V_R$ each include 64 elements permutated in parallel). After the vector data passes through a vector permutation circuit B3, two vector data segments $V_Y$ and $V_Z$ are output (bit widths of both $V_Y$ and $V_Z$ are 64, that is, $V_Y$ and $V_Z$ each include 64 elements, and a permutation order of elements in $V_Y$ and $V_Z$ may be different from a permutation order of elements in $V_S$ and $V_R$), and the two output vector segments $V_Y$ and $V_Z$ are two independent and consecutive vector segments after the two pieces of input vector data $V_S$ and $V_R$ are spliced.

For the three common permutation modes in FIG. 5, the three permutation modes have different permutation requirements. Therefore, in the three modes, the switching unit, a connection manner between the switching unit and the selection unit, the first control signal of the control unit for each 1-of-x selector in the selection unit, and the second control signal for each 1-of-n selector in the switching unit are different. The following elaborates the switching unit, the connection manner between the switching unit and the selection unit, the first control signal of the control unit for each 1-of-x selector in the selection unit, and the second control signal for each 1-of-n selector in the switching unit in the three permutation modes by using one group of outputs as an example (in FIG. 5(a), one group of outputs includes one output element, and the one output element is one line of output, for example, $Y_0$ is one line of output; in FIG. 5(b), one group of outputs includes two output elements, and the two output elements are one line of output, for example, $Y_0$ and $Z_0$ are one line of output; in FIG. 5(c), one group of outputs includes two output elements, and the two output elements are two lines of outputs, for example, $Y_0$ and $Y_1$ are two lines of outputs).

Further, in the permutation modes shown in FIG. 5(b) and FIG. 5(c), each group of outputs includes two output elements. Therefore, in the permutation modes shown in FIG. 5(b) and FIG. 5(c), the switching unit, the connection manner between the switching unit and the selection unit, the first control signal of the control unit for each 1-of-x selector in the selection unit, and the second control signal for each 1-of-n selector in the switching unit are similar.

(1) For the Permutation Mode in FIG. 5(a)

Figure 6:
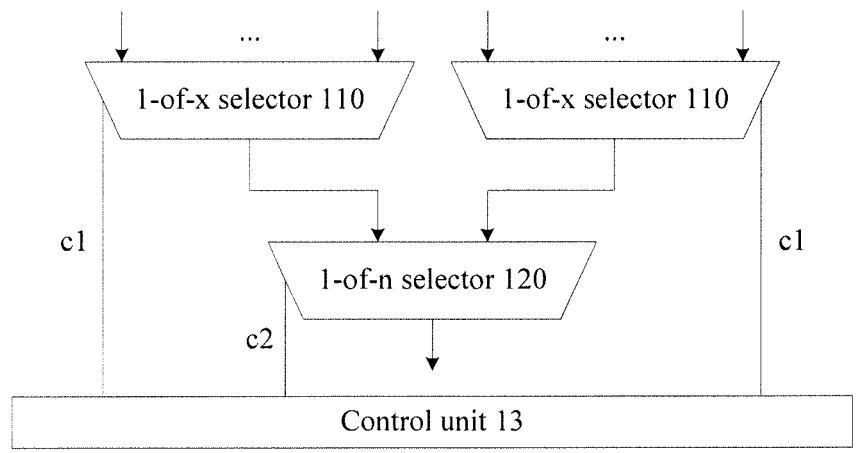
FIG. 6 is a fourth schematic structural diagram of a vector permutation circuit according to an embodiment of the present invention.

In the permutation mode shown in FIG. 5(a), each group of outputs (including one output element) corresponds to 2 1-of-x selectors and 1 1-of-n selector. FIG. 6 shows a schematic diagram of control exercised by the control unit 13 on 2 1-of-x selectors 110 and 1 1-of-n selector 120. By using an example in which the control unit 13 controls 2 1-of-x selectors 110 and 1 1-of-n selector 120, FIG. 6 gives exemplary description on the switching unit, the connection manner between the switching unit and the selection unit, the first control signal of the control unit for each 1-of-x selector in the selection unit, and the second control signal for each 1-of-n selector in the switching unit.

Exemplarily, assuming that the to-be-permutated vector data is $\{S_{63}, S_{62}, \ldots, S_1, S_0\}$ and the vector data is divided into two vector data groups: an odd-number vector data group and an even-number vector data group, the odd-number vector data group is $\{S_{63}, S_{61}, \ldots, S_3, S_1\}$, and the even-number vector data group is $\{S_{62}, S_{60}, \ldots, S_2, S_0\}$. As shown in FIG. 6, the 1-of-x selector is a 1-of-32 selector, and the 1-of-n selector is a 1-of-2 selector. The two vector data groups are input into 2 1-of-32 selectors respectively, so that each 1-of-32 selector in the 2 1-of-32 selectors selects, under a control effect of the first control signal generated by the control unit, an element from the vector data group that is input into the 1-of-32 selector, and outputs the element to the 1-of-2 selector connected to the 1-of-32 selector, and under a control effect of the second control signal generated by the control unit, the 1-of-2 selector selects an element from two elements that are input into the 1-of-2 selector, and outputs the element.

For example, in FIG. 6, it is assumed that the control logic of the control unit is that the $p_i^{th}$ input element $S_{pi}$ is output from the $i^{th}$ line, and the $i^{th}$ line of output is denoted by $Y_i$ (outputting $S_{pi}$); because $p_i$ may be an odd number or an even number, $Y_i$ may come from an element with an odd-number serial number or an element with an even-number serial number. For example, when $p_i=30$, in the 2 1-of-32 selectors shown in FIG. 6, a 1-of-32 selector into which the odd-number vector data group is input needs to select, from the odd-number vector data group, $S_{31}$ for outputting; and a 1-of-32 selector into which the even-number vector data group is input needs to select, from the even-number vector data group, $S_{30}$ for outputting. The 2 1-of-32 selectors each output $S_{30}$ and $S_{31}$ to a 1-of-2 selector connected to respective selectors, and the 1-of-2 selector selects either $S_{30}$ or $S_{31}$ for outputting. When $p_i=31$, in the 2 1-of-32 selectors shown in FIG. 6, the 1-of-32 selector into which the odd-number vector data group is input needs to select, from the odd-number vector data group, $S_{31}$ for outputting; and the 1-of-32 selector into which the even-number vector data group is input needs to select, from the even-number vector data group, $S_{30}$ for outputting. The 2 1-of-32 selectors each output $S_{30}$ and $S_{31}$ to the 1-of-2 selector connected to respective selectors, and the 1-of-32 selector selects either $S_{30}$ or $S_{31}$ for outputting. It can be seen that in this permutation mode, no matter whether $p_i$ is an odd number or an even number, the control logic of the control unit is the same.

Based on the control logic of the control unit in this embodiment shown in FIG. 6, in order to ensure this embodiment to meet the permutation mode in FIG. 5(a), the first control signal of the control unit 13 for each 1-of-32 selector in the selection unit 11 and the second control signal of the control unit 13 for each 1-of-2 selector in the switching unit 12 may be specifically set to:

the first control signal c1 of the control unit for both of the 2 1-of-32 selectors is floor $(p_i/2)$, where floor $(p_i/2)$ is a round-down function of $p_i/2$. The second control signal c2 of the control unit for the 1-of-2 selector is to take a least significant bit of $p_i$.

In this embodiment, there are 64 values of $p_i$. Therefore, $p_i$ may be expressed by using 6 bits, and floor $(p_i/2)$ may be specifically implemented by taking 5 most significant bits of $p_i$. For example, if $p_i$ is 011110 (that is, $p_i$ is 30, and $S_{pi}$ is $S_{30}$), floor $(p_i/2)$ may be implemented by taking 5 most significant bits 01111 of $p_i$, that is, floor $(p_i/2)$ is 15, namely, c1 is 15. Correspondingly, c2 may be implemented by taking a least significant bit 0 of $p_i$ (assuming that when c2 is 0, the 1-of-2 selector selects an element with an even-number serial number for outputting; and when c2 is 1, the 1-of-2 selector selects an element with an odd-number serial number for outputting). In this embodiment, because c1 is 15, each 1-of-32 selector in the 2 1-of-32 selectors selects the 15$^{th}$ element from the first vector data group that is input into the 1-of-32 selector, and outputs the element to the 1-of-2 selector. For example, the 1-of-32 selector into which the even-number vector data group is input selects an element $S_{30}$ with a serial number 30, and outputs the element to the 1-of-2 selector, and the 1-of-32 selector into which the odd-number vector data group is input selects an element $S_{31}$ with a serial number 31, and outputs the element to the 1-of-2 selector. In addition, because c2 is 0, the 1-of-2 selector selects the element $S_{30}$ with an even-number serial number from $S_{30}$ and $S_{31}$ and outputs the element. That is, the $i^{th}$ line of output $Y_i$ comes from the $15^{th}$ element $S_{30}$ in the even-number vector data group.

(2) For the Permutation Mode in FIG. 5(b) and FIG. 5(c)

Figure 7:
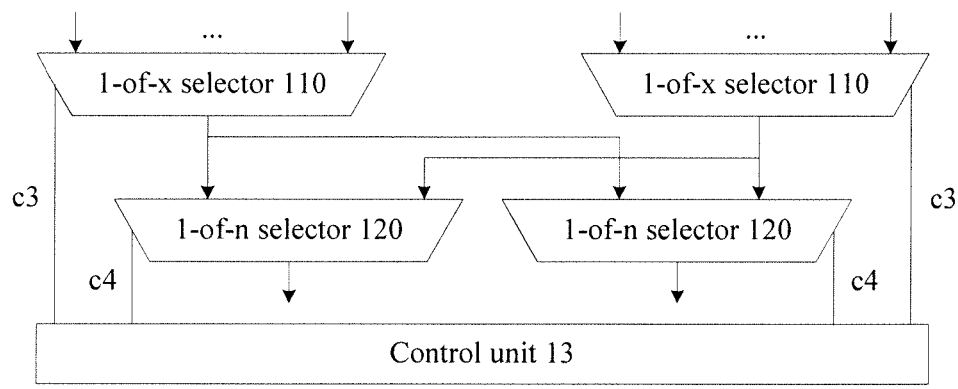
FIG. 7 is a fifth schematic structural diagram of a vector permutation circuit according to an embodiment of the present invention.

In the permutation mode shown in FIG. 5(b) and FIG. 5(c), each group of outputs (including two output elements) corresponds to 2 1-of-x selectors and 2 1-of-n selectors (the 2 1-of-n selectors form 1 2×n crossbar). FIG. 7 shows a schematic diagram of control exercised by the control unit 13 on 2 1-of-x selectors 110 and 1 2×n crossbar (including 2 1-of-n selectors 120). By using an example in which the control unit 13 controls 2 1-of-x selectors 110 and 2 1-of-n selector 120, FIG. 7 gives exemplary description on the switching unit, the connection manner between the switching unit and the selection unit, the first control signal of the control unit for each 1-of-x selector in the selection unit, and the second control signal for each 1-of-n selector in the switching unit.

Exemplarily, assuming that the to-be-permutated vector data is $\{S_{63}, S_{62}, \ldots, S_1, S_0\}$ and the vector data is divided into two vector data groups: an odd-number vector data group and an even-number vector data group, the odd-number vector data group is $\{S_{63}, S_{61}, \ldots, S_3, S_1\}$, and the even-number vector data group is $\{S_{62}, S_{60}, \ldots, S_2, S_0\}$. As shown in FIG. 7, the 1-of-x selector is a 1-of-32 selector, and the 1-of-n selector is a 1-of-2 selector. The 2 1-of-2 selectors in FIG. 7 form 1 2×2 crossbar. The two vector data groups are input into 2 1-of-32 selectors respectively, so that each 1-of-32 selector in the 2 1-of-32 selectors selects, under a control effect of the first control signal generated by the control unit, an element from the vector data group that is input into the 1-of-32 selector, and outputs the element to the 2 1-of-2 selectors connected to the 1-of-32 selector, and under a control effect of the second control signal generated by the control unit, each 1-of-2 selector in the 2 1-of-2 selectors selects an element from two elements that are input into the 1-of-2 selector, and outputs the element.

For example, in FIG. 7, it is assumed that the control logic of the control unit is that the $p_i^{th}$ input element $S_{pi}$ is output from the $i^{th}$ line, and the $i^{th}$ line of output is denoted by $Y_i$ (outputting $S_{pi}$); the $p_{i+1}^{th}$ input element $S_{pi+1}$ is output from the $(i+1)^{th}$ line, and the $(i+1)^{th}$ line of output is denoted by $Y_{i+1}$ (outputting $S_{pi+1}$). Because $S_{pi}$ and $S_{pi+1}$ are two adjacent input elements, $p_i$ and $p_{i+1}$ are certainly one odd number and one even number. In this way, it can be learned that an element with an odd-number serial number in $Y_i$ and $Y_{i+1}$ comes from an element with an odd-number serial number in $S_{pi}$ and $S_{pi+1}$, and an element with an even-number serial number in $Y_i$ and $Y_{i+1}$ comes from an element with an even-number serial number in $S_{pi}$ and $S_{pi+1}$. For example, when $p_i$=30, in the 2 1-of-32 selectors shown in FIG. 7, the 1-of-32 selector into which the odd-number vector data group is input needs to select, from the odd-number vector data group, $S_{31}$ for outputting; and the 1-of-32 selector into which the even-number vector data group is input needs to select, from the even-number vector data group, $S_{30}$ for outputting. The 2 1-of-32 selectors each output $S_{30}$ and $S_{31}$ to 2 1-of-2 selectors connected to respective selectors, and the 2 1-of-2 selectors each select either $S_{30}$ or $S_{31}$ for outputting. In this case, because a final output is $\{S_{31}, S_{30}\}$, it may also be understood as: the 2 1-of-2 selectors output $S_{30}$ and $S_{31}$ directly by means of transparent transmission. When $p_i$=31, in the 2 1-of-32 selectors shown in FIG. 7, the 1-of-32 selector into which the odd-number vector data group is input needs to select, from the odd-number vector data group, $S_{31}$ for outputting; and the 1-of-32 selector into which the even-number vector data group is input needs to select, from the even-number vector data group, $S_{32}$ for outputting. The 2 1-of-32 selectors each output $S_{31}$ and $S_{32}$ to the 2 1-of-2 selectors connected to respective selectors, and the 2 1-of-2 selectors each select an element from $S_{31}$ and $S_{32}$ for outputting. In this case, to avoid finally outputting $\{S_{31}, S_{32}\}$ by the 2 1-of-2 selectors, when the 2 1-of-2 selectors each select an element from $S_{31}$ and $S_{32}$, output positions of the two elements need to be changed to ensure that the 2 1-of-2 selectors finally output $\{S_{32}, S_{31}\}$. This circumstance may also be understood as: the 2 1-of-2 selectors switch and output $S_{31}$ and $S_{32}$.

It should be noted that in this embodiment, under a control logic of the control unit on the selection unit, an output order may be opposite between two adjacent elements in a group of outputs of the selection unit. For example, $\{S_{32}, S_{31}\}$ needs to be output, but $\{S_{31}, S_{32}\}$ is obtained after the selection unit makes a selection. Therefore, $\{S_{31}, S_{32}\}$ needs to be further input into 2 1-of-2 selectors, so that the 2 1-of-2 selectors each select, from two elements $S_{31}$ and $S_{32}$, an element for outputting, and finally output $\{S_{32}, S_{31}\}$. Specifically, as shown in FIG. 7, from left to right, the first 1-of-2 selector 120 selects $S_{32}$ for outputting, the second 1-of-2 selector 120 selects $S_{31}$ for outputting, and therefore, the 2 1-of-2 selectors 120 can implement a function of switching two elements in $\{S_{31}, S_{32}\}$.

Certainly, a person skilled in the art may understand that if $\{S_{32}, S_{31}\}$ needs to be output and $\{S_{32}, S_{31}\}$ is obtained after the selection unit makes a selection, even if $\{S_{32}, S_{31}\}$ is input into 2 1-of-2 selectors, the 2 1-of-2 selectors each can select an element from two elements $S_{32}$ and $S_{31}$ for outputting, and finally output $\{S_{32}, S_{31}\}$. Specifically, as shown in FIG. 7, from left to right, the first 1-of-2 selector 120 selects $S_{32}$ for outputting, the second 1-of-2 selector 120 selects $S_{31}$ for outputting, and therefore, the 2 1-of-2 selectors can implement a function of transparently transmitting the two elements in $\{S_{32}, S_{31}\}$.

In this embodiment of the present invention, no matter whether the switching unit transparently transmits and directly outputs each element in the second vector data group that is input into the switching unit or switches and outputs some elements in the second vector data group, it can be deemed that the switching unit has performed switching in the second vector data group.

Further, the control unit can exercise control no matter whether the switching unit transparently transmits and directly outputs each element in the second vector data group that is input into the switching unit or switches and outputs some elements in the second vector data group. Specifically, if the control unit determines that it is not necessary to switch each element in the second vector data group that is input into the switching unit, the control unit may control the switching unit to transparently transmits and directly outputs each element in the second vector data group; or if the control unit determines that it is necessary to switch some elements in the second vector data group that is input into the switching unit, the control unit may control the switching unit to switch and output the elements in the second vector data group.

The foregoing only exemplarily describes the selection unit, the switching unit, and the control unit in the vector permutation circuit provided in this embodiment of the present invention. In practical application, adaptive adjustment and/or changes may be performed according to a specific vector data permutation mode and vector data grouping, and the present invention places no limitation.

In addition, in this embodiment, when $p_i=63$, $p_{i+1}=64$. In this case, because the bit width of the to-be-permutated vector data is exceeded (that is, a serial number of an element in the to-be-permutated vector data is exceeded), processing in this embodiment may be performed in a loopback manner or in a manner of outputting a same element. For example, if the processing in this embodiment is performed in the loopback manner, $p_{i+1}=64$ may be converted into $p_{i+1}=0$. In this way, it can be ensured that the 2 1-of-2 selectors finally output $\{S_{63}, S_0\}$. If the processing in this embodiment is performed in the manner of outputting a same element, $p_{i+1}=64$ may be converted into $p_{i+1}=63$. In this way, it can be ensured that the 2 1-of-2 selectors finally output $\{S_{63}, S_{63}\}$.

Based on the control logic of the control unit in this embodiment shown in FIG. 7, in order to ensure this embodiment to meet the permutation mode in FIG. 5(*b*) and FIG. 5(*c*), the first control signal of the control unit 13 for each 1-of-32 selector in the selection unit 11 and the second control signal of the control unit 13 for each 1-of-2 selector in the switching unit 12 may be specifically set to:

(1) When $p_i$ is an even number, the first control signal c3 of the control unit for a 1-of-32 selector into which an odd-number vector data group is input is floor $(p_i/2)$, the first control signal c3 of the control unit for a 1-of-32 selector into which an even-number vector data group is input is floor $(p_1/2)$, the second control signal c4 of the control unit for a 1-of-2 selector in each 2×2 crossbar is 0 (indicating that an element with an even-number serial number is selected for outputting), and the second control signal c4 for another 1-of-2 selector in each 2×2 crossbar is 1 (indicating that an element with an odd-number serial number is selected for outputting).

(2) When $p_i$ is an odd number, the first control signal c3 of the control unit for a 1-of-32 selector into which an odd-number vector data group is input is floor $(p_i/2)$, the first control signal c3 of the control unit for a 1-of-32 selector into which an even-number vector data group is input is floor $(p_i/2)+1$, the second control signal c4 of the control unit for a 1-of-2 selector in each 2×2 crossbar is 1 (indicating that an element with an odd-number serial number is selected for outputting), and the second control signal c4 for another 1-of-2 selector in each 2×2 crossbar is 0 (indicating that an element with an even-number serial number is selected for outputting).

When floor $(p_i/2)+1$ is greater than 32, floor $(p_i/2)+1$ is converted into 0, that is, an element with a serial number 0 is selected for outputting.

Specifically, in this embodiment, there are 64 values of $p_i$. Therefore, $p_i$ may be expressed by using 6 bits, and floor $(p_i/2)$ may be specifically implemented by taking 5 most significant bits of $p_i$. Correspondingly, c4 may be implemented by taking a least significant bit 0 of $p_i$ (assuming that when c4 is 0, the 1-of-2 selector selects an element with an even-number serial number for outputting; and when c4 is 1, the 1-of-2 selector selects an element with an odd-number serial number for outputting). For an example of floor $(p_i/2)$, reference may be made to the example of floor $(p_i/2)$ in the embodiment shown in FIG. 6; and for an example of c4, reference may be made to the example of c2 in the embodiment shown in FIG. 6, and no detailed description is given herein any further.

It should be noted that FIG. 6 and FIG. 7 are merely exemplary description using one group of outputs as an example. In this embodiment of the present invention, each group of outputs in the to-be-permutated vector data may be implemented according to the circuit in FIG. 6 and FIG. 7, and no detailed description is given herein any further.

Optionally, for the three permutation modes shown in FIG. 5, in the vector permutation circuit provided in this embodiment of the present invention, the following two correspondences exist between the quantity m of selection units and the quantity n of vector data groups after the grouping unit groups the to-be-permutated vector data.

(1) For FIG. 5(*a*) and FIG. 5(*b*), m=2n, and each vector data group in the n vector data groups corresponds to two selection units.

(2) For FIG. 5(*c*), m=n, and each vector data group in the n vector data groups corresponds to one selection unit.

The following uses the three permutation modes shown in FIG. 5 as an example to give exemplary description on a vector permutation circuit provided in an embodiment of the present invention.

Embodiment 1

Figure 8:
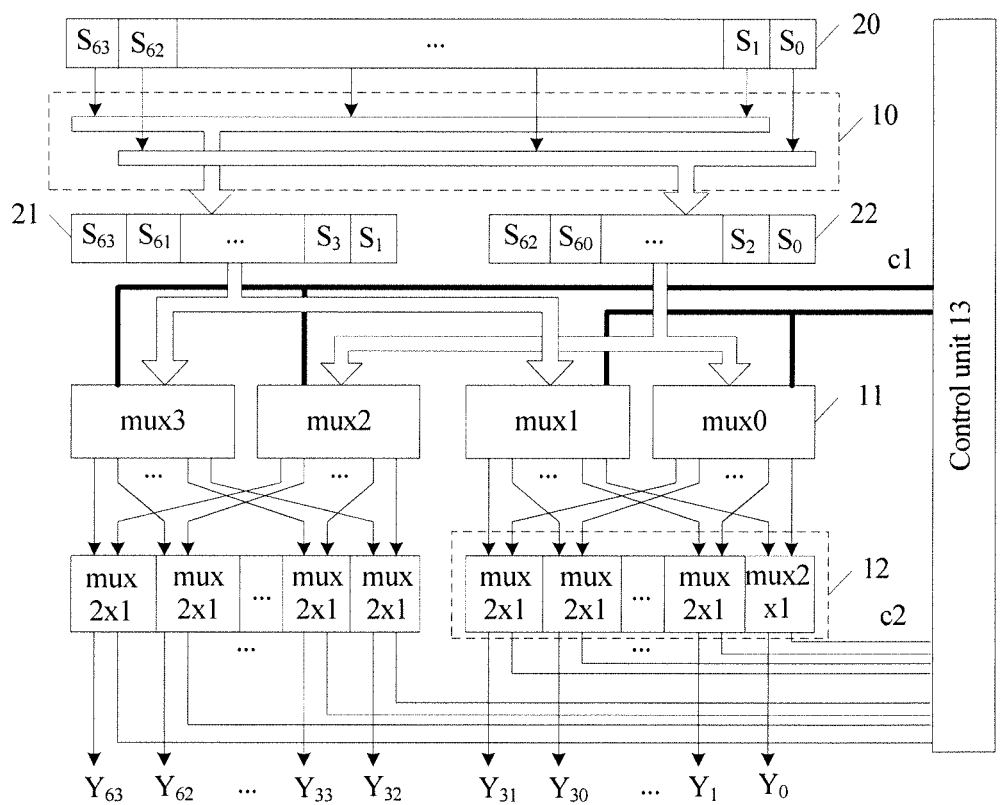
FIG. 8 is a sixth schematic structural diagram of a vector permutation circuit according to an embodiment of the present invention.

For FIG. 5(*a*), using an example in which the bit width of the to-be-permutated vector data is 64 and the to-be-permutated vector data is divided into an odd-number vector data group and an even-number vector data group, the vector permutation circuit provided in this embodiment of the present invention is shown in FIG. 8.

In FIG. 8, the grouping unit 10 first groups, according to odd-number serial numbers and even-number serial numbers of elements, the to-be-permutated vector data $\{S_{63}, S_{62}, \ldots, S_1, S_0\}$ (denoted by 20 in FIG. 8) that is input by the register into the grouping unit 10, so as to obtain an odd-number vector data group (denoted by 21 in FIG. 8) and an even-number vector data group (denoted by 22 in FIG. 8), where 21 is $\{S_{63}, S_{61}, \ldots, S_3, S_1\}$, 22 is $\{S_{62}, S_{60}, \ldots, S_2, S_0\}$, and 21 and 22 each include 32 elements.

Because the to-be-permutated vector data in FIG. 8 is divided into two vector data groups, a quantity of selection units 11 is m=2n=2×2=4 (in this embodiment, one vector data group corresponds to two selection units 11). That is, there are 4 selection units 11 in FIG. 8, which are denoted by mux0, mux1, mux2, and mux3. According to a circuit principle in FIG. 6, the even-number vector data group is input into the selection units mux0 and mux2 concurrently, and the odd-number vector data group is input into the selection units mux1 and mux3 concurrently. As shown in FIG. 8, each selection unit 11 is a 32×32 crossbar, and consists of 32 1-of-32 selectors. Because each 1-of-32 selector is separately controlled by the control unit 13, each selection unit 11 needs 32 independent control signals (the 32 control signals of the control unit 13 for each selection unit 11 in FIG. 8 are denoted by bold solid lines, which may be understood as: the control unit 13 controls the 32 1-of-32 selectors in each 32×32 crossbar separately). In FIG. 8, under an effect of a control signal of the control unit 13, each selection unit 11 (that is, 32×32 crossbar) can select, from the vector data group that is input into the selection unit 11, 32 elements for outputting. In FIG. 8, the control unit 13 outputs a same first control signal to each corresponding 1-of-32 selector in the selection units mux0 and mux1, and also outputs a same first control signal to each corresponding 1-of-32 selector in the selection units mux2 and mux3. Specifically, for specific implementation of the first control signal, reference may be made to related description about the first control signal in the embodiment shown in FIG. 6, and no detailed description is given herein any further.

It should be noted that in this embodiment, the 2 1-of-32 selectors shown in FIG. 6 are 1-of-32 selectors in two selection units 11. For example, one 1-of-32 selector is a 1-of-32 selector in the selection unit mux0, and the other 1-of-32 selector is a 1-of-32 selector in a corresponding position in the selection unit mux1. The corresponding position may be understood as: the 2 1-of-32 selectors each select an element in the same position from the vector data group that is input into respective selectors, for example, the 1-of-32 selector located in mux0 selects, from the even-number vector data group, the 15$^{th}$ element for outputting, and the 1-of-32 selector located in mux1 also selects, from the odd-number vector data group, the 15$^{th}$ element for outputting.

It can be understood that in FIG. 8, 32 least significant elements can be obtained after the selection units mux0 and mux1 are combined to select the vector data group that is input into respective selection units, and 32 most significant elements can be obtained after mux2 and mux3 are combined to select the vector data group that is input into respective selection units. Which specific elements in the to-be-permutated vector data are the 32 least significant elements and the 32 most significant elements depends on specific control logic.

As shown in FIG. 8, the vector data selected by the selection unit 11 is correspondingly input into the switching unit 12, and the switching unit 12 switches and outputs the elements in the vector data. Specifically, in this embodiment, because a position corresponding to each element includes only one output element, 2 1-of-32 selectors in two selection units 11 each select an element from the vector data group that is input into respective selectors, and output the element to the 1-of-2 selector (denoted by mux2×1 in FIG. 8) connected to the 2 1-of-32 selectors, and the 1-of-2 selector selects, from two elements input into the selector, an element for outputting. In this way, the vector data selected by the selection units mux0 and mux1 further undergoes a selection made by the corresponding 1-of-2 selector in the switching unit 12 connected to the selection units mux0 and mux1, and finally, 32 least significant elements such as $\{Y_{31}, Y_{30}, \ldots, Y_1, Y_0\}$ in FIG. 8 are output. Correspondingly, the vector data selected by the selection units mux2 and mux3 further undergoes a selection made by the corresponding 1-of-2 selector in the switching unit 12 connected to the selection units mux2 and mux3, and finally, 32 most significant elements such as $\{Y_{63}, Y_{62}, \ldots, Y_{33}, Y_{32}\}$ in FIG. 8 are output. In FIG. 8, for the first control signal (denoted by c1 in FIG. 8) of the control unit 13 for each 1-of-32 selector in the selection unit 11, reference may be made to related description about the first control signal in the embodiment shown in FIG. 6; and for the second control signal (denoted by c2 in FIG. 8) of the control unit 13 for each 1-of-2 selector in the switching unit 12, reference may be made to related description about the second control signal in the embodiment shown in FIG. 6, and no detailed description is given herein any further.

It can be understood that in FIG. 8, because the quantity of selection units 11 is 4, a quantity of switching units 12 is 2; because one line of input corresponds to one line of output, that is, a quantity of elements in the vector data that needs to be output is 64, a quantity of 1-of-2 selectors in the two switching units 12 in this embodiment is 64, that is, each switching unit 12 consists of 32 1-of-2 selectors.

To more clearly understand an implementation principle of the vector permutation circuit shown in FIG. 8, the following further interprets the vector permutation circuit shown in FIG. 8 from a perspective of code.

The vector permutation circuit shown in FIG. 8 may be interpreted by using the following code:

//$V_Y[i]=V_S[p[i]]$, where i=0, 1, . . . , 63
output element_type $V_Y[63:0]$; //output 64 lines of vector data
input element_type $V_S[63:0]$; //input 64 lines of vector data
input [5:0] p[63:0]; //selection mode, including 64 control signals, each control signal having 5 bits
logic element_type $V_{S\_odd}[31:0]$;
logic element_type $V_{S\_even}[31:0]$;
for (int i=0;i<64;i=i+1) begin
//perform odd-number and even-number grouping on each element in the input vector data
$V_{S\_odd}[i]=V_S[2*i+1]$; //odd-number vector data group
$V_{S\_even}[i]=V_S[2*i]$; //even-number vector data group
end
for (int i=0;i<64;i=i+1) begin
//when p[i][0]==1, an output element comes from the input odd-number vector data group; otherwise, the element comes from the input even-number vector data group
$V_Y[i]=p[i][0]?V_{S\_odd}$[floor (p[i]/2)]: $V_{S\_even}$[floor (p[i]/2)];
//c1 is a round-down function, and in actual implementation, floor (p[i]/2) is specifically p[i][5:1], that is, 5 most significant bits of p[i] are taken
end It should be noted that the code is merely intended to more clearly interpret the implementation principle shown in FIG. 8. In specific implementation, FIG. 8 is implemented by using a logic circuit that includes various selectors.

Embodiment 2

Figure 9:
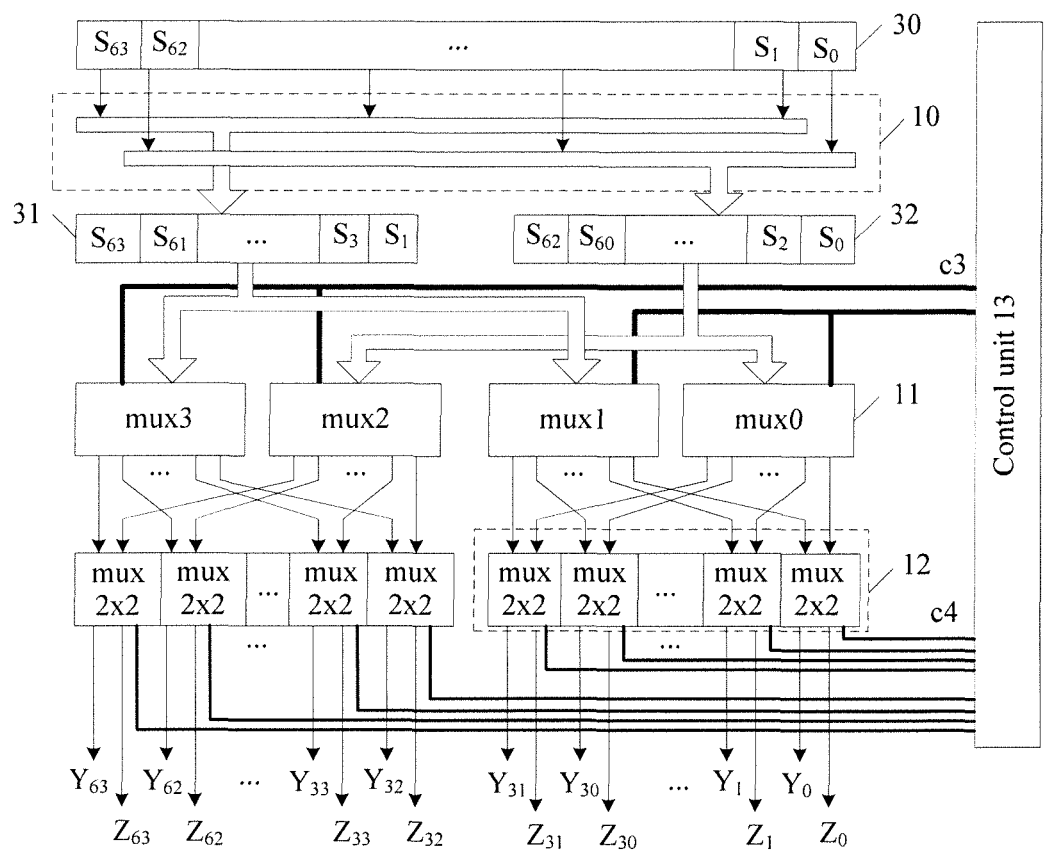
FIG. 9 is a seventh schematic structural diagram of a vector permutation circuit according to an embodiment of the present invention.

For FIG. 5(b), using an example in which the bit width of the to-be-permutated vector data is 64 and the to-be-permutated vector data is divided into an odd-number vector data group and an even-number vector data group, the vector permutation circuit provided in this embodiment of the present invention is shown in FIG. 9.

In FIG. 9, the grouping unit 10 first groups, according to odd-number serial numbers and even-number serial numbers of elements, the to-be-permutated vector data $\{S_{63}, S_{62}, \ldots, S_1, S_0\}$ (denoted by 30 in FIG. 9) that is input by the register into the grouping unit 10, so as to obtain an odd-number vector data group (denoted by 31 in FIG. 9) and an even-number vector data group (denoted by 32 in FIG. 9), where 31 is $\{S_{63}, S_{61}, \ldots, S_3, S_1\}$, 32 is $\{S_{62}, S_{60}, \ldots, S_2, S_0\}$, and 31 and 32 each include 32 elements.

Because the to-be-permutated vector data in FIG. 9 is divided into two vector data groups, a quantity of selection units 11 is m=2n=2×2=4 (in this embodiment, one vector data group corresponds to two selection units 11). That is, there are 4 selection units 11 in FIG. 9, which are denoted by mux0, mux1, mux2, and mux3. In this embodiment, the even-number vector data group is input into the selection units mux0 and mux2 concurrently, and the odd-number vector data group is input into the selection units mux1 and mux3 concurrently. As shown in FIG. 9, each selection unit 11 is a 32×32 crossbar, and consists of 32 1-of-32 selectors. Because each 1-of-32 selector is separately controlled by the control unit 13, each selection unit 11 needs 32 independent control signals (the 32 control signals of the control unit 13 for each selection unit 11 in FIG. 9 are denoted by bold solid lines, which may be understood as: the control unit 13 controls the 32 1-of-32 selectors in each 32×32 crossbar separately). In FIG. 9, under an effect of a control signal of the control unit 13, each selection unit 11 (that is, 32×32 crossbar) can select, from the vector data group that is input into the selection unit 11, 32 elements for outputting. In FIG. 9, the control unit 13 outputs a same first control signal to each corresponding 1-of-32 selector in the selection units mux0 and mux1, and also outputs a same first control signal to each corresponding 1-of-32 selector in the selection units mux2 and mux3. Specifically, for specific implementation of the first control signal, reference may be made to related description about the first control signal in the embodiment shown in FIG. 7, and no detailed description is given herein any further.

It should be noted that in this embodiment, the 2 1-of-32 selectors shown in FIG. 7 are 1-of-32 selectors in two selection units 11. For example, one 1-of-32 selector is a 1-of-32 selector in the selection unit mux0, and the other 1-of-32 selector is a 1-of-32 selector in a corresponding position in the selection unit mux1. The corresponding position may be understood as: the 2 1-of-32 selectors each select an element in the same position or an adjacent position from the vector data group that is input into respective selectors, for example, when the output element comes from the $30^{th}$ input element and the $31^{st}$ input element, the 1-of-32 selector located in mux0 selects, from the even-number vector data group, the $15^{th}$ element for outputting, and the 1-of-32 selector located in mux1 also selects, from the odd-number vector data group, the $15^{th}$ element for outputting; and when the output element comes from the $31^{st}$ input element and the $32^{nd}$ input element, the 1-of-32 selector in mux0 selects, from the even-number vector data group, the $16^{th}$ element for outputting, and the 1-of-32 selector located in mux1 selects, from the odd-number vector data group, the $15^{th}$ element for outputting.

It can be understood that in FIG. 9, two groups of 32 least significant elements can be obtained after the selection units mux0 and mux1 are combined to select the vector data group that is input into respective selection units, and two groups of 32 most significant elements can be obtained after mux2 and mux3 are combined to select the vector data group that is input into respective selection units. Which specific elements in the to-be-permutated vector data are the 32 least significant elements in each group and the 32 most significant elements in each group depends on specific control logic.

As shown in FIG. 9, the vector data selected by the selection unit 11 is correspondingly input into the switching unit 12, and the switching unit 12 switches and outputs the elements in the vector data. Specifically, in this embodiment, because a position corresponding to each element includes two output elements, 2 1-of-32 selectors in two selection units 11 each select an element from the vector data group that is input into respective selectors, and output the element to the 2×2 crossbar (denoted by mux2×2 in FIG. 9) connected to the 2 1-of-32 selectors. The crossbar consists of 2 1-of-2 selectors, and the 2 1-of-2 selectors each select, from two elements that are input into respective selectors, an element for outputting. In this way, the vector data selected by the selection units mux0 and mux1 further undergoes a selection made by the corresponding 2×2 crossbar (specifically 2 1-of-2 selectors) in the switching unit 12 connected to the selection units mux0 and mux1, and finally, two groups of 32 least significant elements such as $\{Y_{31}, Y_{30}, \ldots, Y_1, Y_0\}$ and $\{Z_{31}, Z_{30}, \ldots, Z_1, Z_0\}$ are output. Correspondingly, the vector data selected by the selection units mux2 and mux3 further undergoes a selection made by the corresponding 2×2 crossbar (specifically 2 1-of-2 selectors) in the switching unit 12 connected to the selection units mux2 and mux3, and finally, two groups of 32 most significant elements such as $\{Y_{63}, Y_{62}, \ldots, Y_{33}, Y_{32}\}$ and $\{Z_{63}, Z_{62}, \ldots, Z_{33}, Z_{32}\}$ are output. In FIG. 9, for the first control signal (denoted by c3 in FIG. 9) of the control unit 13 for each 1-of-32 selector in the selection unit 11, reference may be made to related description about the first control signal in the embodiment shown in FIG. 7; and for the second control signal (denoted by c4 in FIG. 9, where 2 second control signals of the control unit 13 for each 2×2 crossbar are denoted by bold solid lines, which may be understood as: the control unit 13 controls 2 1-of-2 selectors separately in each 2×2 crossbar) of the control unit 13 for each 1-of-2 selector in the switching unit 12, reference may be made to related description about the second control signal in the embodiment shown in FIG. 7, and no detailed description is given herein any further.

It can be understood that in FIG. 9, because the quantity of selection units 11 is 4, the quantity of switching units 12 is 2; one group of outputs includes two lines of outputs, that is, two groups of vector data need to be output, and the quantity of elements in each group of vector data is 64, and therefore, in this embodiment, one 1-of-2 selector needs to be set for elements in same positions in the two groups of vector data separately, that is, one group of outputs corresponds to one 2×2 crossbar. Therefore, in this embodiment, the quantity of 1-of-2 selectors in the two switching units 12 is 128, that is, each switching unit 12 consists of 64 1-of-2 selectors, that is, 32 2×2 crossbars.

To more clearly understand an implementation principle of the vector permutation circuit shown in FIG. 9, the following further interprets the vector permutation circuit shown in FIG. 9 from a perspective of code.

The vector permutation circuit shown in FIG. 9 may be interpreted by using the following code:

//$V_Y[i]=V_S[p[i]]$ and $V_Z[i]=V_S[(p[i]+1)\%64]$, where i=0, 1, . . . , 63 output element_type $V_Y[63:0]$; //output 64 lines of vector data output element_type $V_Z[63:0]$; //output 64 lines of vector data input element_type $V_S[63:0]$; //input 64 lines of vector data input [5:0] p[63:0]; //selection mode, including 64 control signals, each control signal having 5 bits logic [4:0] po[63:0]; //control signals of the odd-number vector data group, 64 control signals in total, each having 5 bits logic [4:0] pe[63:0]; //control signals of the even-number vector data group, 64 control signals in total, each having 5 bits logic element_type $V_{S\_odd}[31:0]$;

logic element_type $V_{S\_even}[31:0]$;

for (int i=0;i<64;i=i+1) begin

//perform odd-number and even-number grouping on each element in the input vector data $V_{S\_odd}[i]=V_S[2*i+1]$; //odd-number vector data group $V_{S\_even}[i]=V_S[2*i]$; //even-number vector data group end for (int i=0;i<64;i=i+1) begin po[i]=floor (p[i]/2);

pe[i]=p[i][0]? (floor (p[i]/2)+1):floor (p[i]/2);

//when p[i][0]==0, an output element pair is {element with an even-number serial number, element with an odd-number serial number}, 2 1-of-2 selectors perform direct outputting by means of transparent transmission //when p[i][0]==1, an output element pair is {element with an odd-number serial number, element with an even-number serial number}, 2 1-of-2 selectors output elements after switching the elements $V_Y[i]$=p[i][0]? $V_{S\_odd}$[po[i]]: $V_{S\_even}$[pe[i]];
$V_Z[i]$=p[i][0]? $V_{S\_even}$[pe[i]]: $V_{S\_odd}$[po[i]];
end It should be noted that the code is merely intended to more clearly interpret the implementation principle shown in FIG. 9. In specific implementation, FIG. 9 is implemented by using a logic circuit that includes selectors.

Embodiment 3

Figure 10:
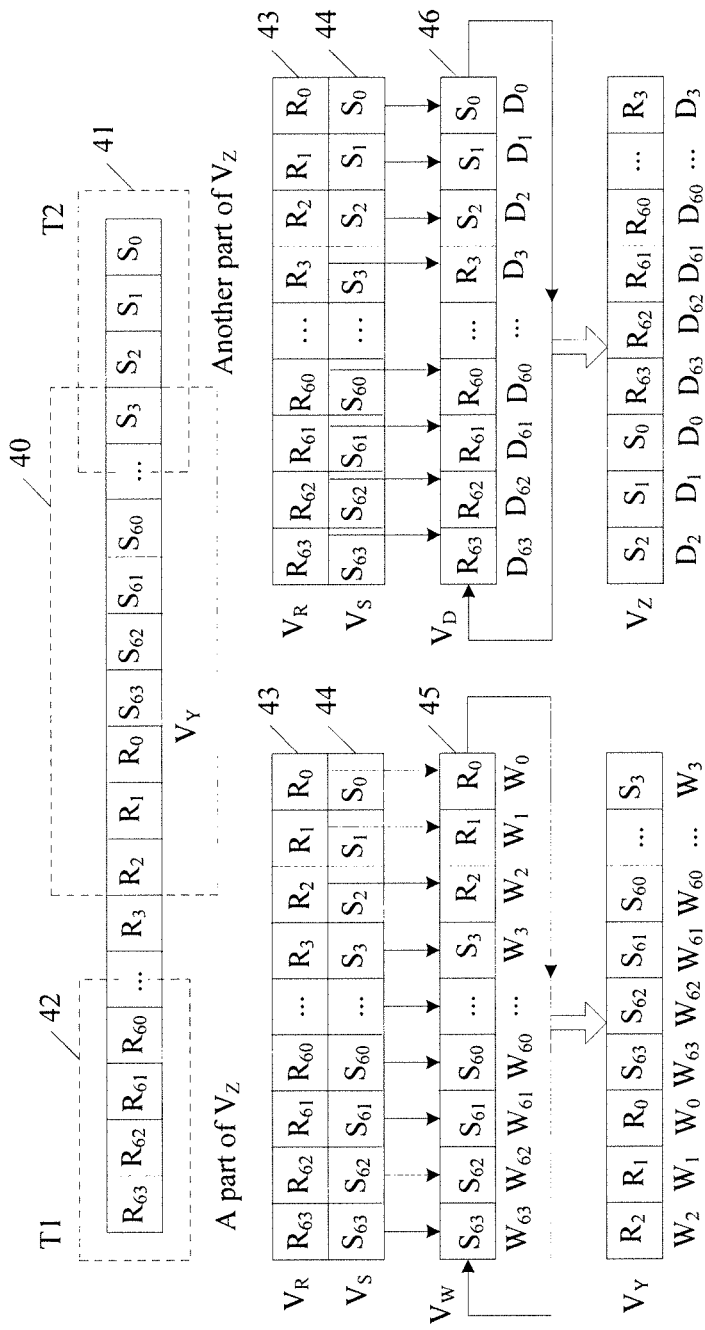
FIG. 10 is a first schematic diagram of vector data conversion according to an embodiment of the present invention.

For FIG. 5(c), in application of an FIR filter, consecutive vector data segments need to be selected from two pieces of input vector data (a selection process in this embodiment is equivalent to permutating original vector data) for a purpose of various calculations such as a multiply-accumulate calculation. As shown in FIG. 10, it is assumed that there are two pieces of vector data: $V_R$ and $V_S$, where $V_R$ is $\{R_{63}, R_{62}, \ldots, R_1, R_0\}$, and $V_S$ is $\{S_{63}, S_{62}, \ldots, S_1, S_0\}$. It can be seen that bit widths of both $V_R$ and $V_S$ are 64. First, two pieces of input vector data $V_R$ and $V_S$ are spliced into long vector data, and then two pieces of consecutive vector data $V_Y$ and $V_Z$ are selected according to shift_count_0 and shift_count_1 respectively, where shift_count_0 and shift_count_1 denote offsets of the output vector data in the spliced vector data, and in FIG. 10, when some elements in the output vector data exceed a leftmost end (denoted by T1 in FIG. 10) of the spliced vector data, the elements may be selected to output random values or loop back to a rightmost end (denoted by T2 in FIG. 10) of the spliced vector data (for example, in FIG. 10, 40 is $V_Y$, and 41 and 42 are spliced to form $V_Z$). In this embodiment, the implementation method of Embodiment 3 is described by using loopback to the rightmost end of the spliced vector data as an example. Because bit widths of the two pieces of input vector data $V_Y$ and $V_Z$ are 64, that is, both the two pieces of vector data are 64-line (each including 64 elements) vector data, a preprocessing selection needs to be performed first before the vector data is permutated, so as to convert $V_R$ (denoted by 43 in FIG. 10) and $V_S$ (denoted by 44 in FIG. 10) shown in FIG. 10 into $V_W$ and $V_D$ (in FIG. 10, $V_W$ is denoted by 45, and $V_D$ is denoted by 46). Because a process of selecting $V_Y$ is the same as a process of selecting $V_Z$ from the two pieces of input vector data $V_R$ and $V_S$, selecting $V_Y$ is used as an example herein to give exemplary description about the preprocessing in this embodiment of the present invention. With selecting $V_Y$ used as an example in this embodiment, all elements that may appear in $V_Y$ are selected by preprocessing the two pieces of input vector data $V_R$ and $V_S$, so as to form intermediate vector data $V_W$, and an element $W_i$ necessarily comes from $R_i$ or $S_i$, which is determined by consecutive serial numbers of adjacent elements in the output vector data. The intermediate vector data $V_W$ and the finally output vector data $V_Y$ have same elements, but an order of the elements in the vector data may differ. Therefore, the intermediate vector data $V_W$ needs to be moved rightward cyclically. The cyclic rightward moving may be implemented by using 2 32×32 crossbars.

Figure 11:
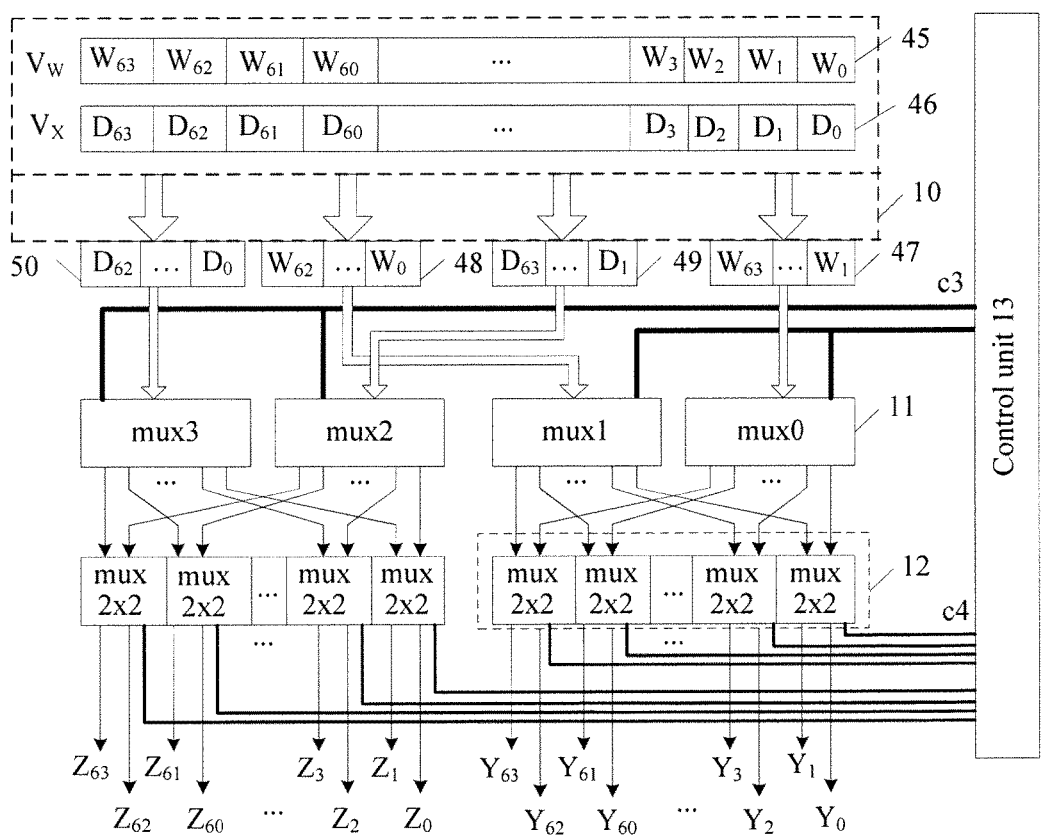
FIG. 11 is an eighth schematic structural diagram of a vector permutation circuit according to an embodiment of the present invention.

In this embodiment, using an example in which the two pieces of intermediate vector data $V_W$ and $V_D$ obtained by the preprocessing are an odd-number vector data group and an even-number vector data group, the vector permutation circuit provided in this embodiment of the present invention is shown in FIG. 11.

In FIG. 11, according to odd-number serial numbers and even-number serial numbers of the elements, the grouping unit 10 groups the two vector data groups $V_W$ (denoted by 45 in FIG. 11) and $V_D$ (denoted by 46 in FIG. 11) obtained in FIG. 10, so as to obtain four vector data groups 47, 48, 49, and 50, where 47 is $\{W_{63}, \ldots, W_1\}$, 48 is $\{W_{62}, \ldots, W_0\}$, 49 is $\{D_{63}, \ldots, D_1\}$, 50 is $\{D_{62}, \ldots, D_0\}$, and 47, 48, 49, and 50 each include 32 elements.

Because each of the two pieces of to-be-permutated vector data in FIG. 11 is divided into two vector data groups, which are four vector data groups in total, a quantity of selection units 11 is m=n=4 (in this embodiment, one vector data group corresponds to one selection unit 11). That is, there are 4 selection units in FIG. 11, which are denoted by mux0, mux1, mux2, and mux3. In this embodiment, each vector data group is input into one selection unit 11, which may be specifically shown in FIG. 11. As shown in FIG. 11, each selection unit 11 is a 32×32 crossbar, and consists of 32 1-of-32 selectors. Because each 1-of-32 selector is separately controlled by the control unit 13, each selection unit 11 needs 32 independent control signals (the 32 control signals of the control unit 13 for each selection unit 11 in FIG. 11 are denoted by bold solid lines, which may be understood as: the control unit 13 controls the 32 1-of-32 selectors in each 32×32 crossbar separately). In FIG. 11, under an effect of a control signal of the control unit 13, each selection unit 11 (that is, 32×32 crossbar) can select, from the vector data group that is input into the selection unit 11, 32 elements for outputting. Each corresponding 1-of-32 selector in the selection units mux0, mux1, mux2, and mux3 in FIG. 11 is controlled separately by the control unit. Specifically, control logic in this embodiment may be set according to the vector data that needs to be output in practical application. A principle of the setting is similar to the control logic setting principles in Embodiment 1 and Embodiment 2, and is not described herein any further.

It should be noted that in this embodiment, the 2 1-of-32 selectors shown in FIG. 7 are 1-of-32 selectors in two selection units 11. For example, one 1-of-32 selector is a 1-of-32 selector in the selection unit mux0, and the other 1-of-32 selector is a 1-of-32 selector in a corresponding position in the selection unit mux1. For the corresponding position, reference may be made to the detailed description about the corresponding position in Embodiment 2, and no repeated description is given herein any further.

It can be understood that in FIG. 11, one vector data group corresponds to one selection unit. Therefore, after the selection units mux0 and mux1 are combined to select the vector data group that is input into respective selection units, one group of 64 elements may be obtained, which implements cyclic rightward moving of the intermediate vector data $V_W$ in FIG. 10. After the selection units mux2 and mux3 are combined to select the vector data group that is input into respective selection units, another group of 64 elements may be obtained, which implements cyclic rightward moving of the intermediate vector data $V_D$ in FIG. 10. Which specific elements in the to-be-permutated vector data are the 64 elements in each group depends on specific control logic.

As shown in FIG. 11, the vector data selected by the selection unit 11 is correspondingly input into the switching unit 12, and the switching unit 12 switches and outputs the elements in the vector data. Specifically, in this embodiment, because a position corresponding to each element includes two lines of outputs, 2 1-of-32 selectors in two selection units 11 each select an element from the vector data group that is input into respective selectors, and output the element to a 2×2 crossbar (denoted by mux2×2 in FIG. 11) connected to the 2 1-of-32 selectors, where the crossbar consists of 2 1-of-2 selectors, and the 2 1-of-2 selectors each select, from two elements input into respective selectors, an element for outputting. In this way, the vector data selected by the selection units mux0 and mux1 further undergoes a selection made by the corresponding 2×2 crossbar (specifically 2 1-of-2 selectors) in the switching unit 12 connected to the selection units mux0 and mux1, and finally, $V_Y$ is output, where $V_Y$ is $\{Y_{63}, Y_{62}, \ldots, Y_1, Y_0\}$. Correspondingly, the vector data selected by the selection units mux2 and mux3 further undergoes a selection made by the corresponding 2×2 crossbar (specifically 2 1-of-2 selectors) in the switching unit 12 connected to the selection units mux2 and mux3, and finally, $V_Z$ is output, where $V_Z$ is $\{Z_{63}, Z_{62}, \ldots, Z_1, Z_0\}$. In FIG. 11, for the first control signal (denoted by c3 in FIG. 11) of the control unit 13 for each 1-of-32 selector in the selection unit 11, reference may be made to related description about the first control signal in the embodiment shown in FIG. 7; and for the second control signal (denoted by c4 in FIG. 11, where 2 second control signals of the control unit 13 for each 2×2 crossbar are denoted by bold solid lines, which may be understood as: the control unit 13 controls 2 1-of-2 selectors separately in each 2×2 crossbar) of the control unit 13 for each 1-of-2 selector in the switching unit 12, reference may be made to related description about the second control signal in the embodiment shown in FIG. 7, and no detailed description is given herein any further.

In this embodiment, because the selection unit 11 performs cyclic rightward moving on and outputs the vector data that is input into the selection unit, it can be ensured that the serial numbers of two adjacent elements are adjacent in the vector data that is finally output by the switching unit 12.

It can be understood that in FIG. 11, because the quantity of selection units 11 is 4, the quantity of switching units 12 is 2; one group of outputs includes two lines of outputs, that is, two groups of vector data need to be output, and the quantity of elements in each group of vector data is 64, and therefore, in this embodiment, one 1-of-2 selector needs to be set for elements in same positions in the two groups of vector data separately, that is, one group of outputs corresponds to one 2×2 crossbar. Therefore, in this embodiment, the quantity of 1-of-2 selectors in the two switching units 12 is 128, that is, each switching unit 12 consists of 64 1-of-2 selectors, that is, 32 2×2 crossbars.

To more clearly understand an implementation principle of the vector permutation circuit shown in FIG. 11, the following further interprets the vector permutation circuit shown in FIG. 11 from a perspective of code.

The vector permutation circuit shown in FIG. 11 may be interpreted by using the following code:

//a value range of shift_count_1/0 is 0-127
/N_H[63:0]={V_S[63:0], V_R[63:0], V_S[63:0]}>>shift_count_0[6:0]
/N_Z[63:0]={V_S[63:0], V_R[63:0], V_S[63:0]}>>shift_count_1[6:0]
output element_type V_Y[63:0]; //output 64 lines of vector data V_Y
output element_type V_Z[63:0]; //output 64 lines of vector data V_Z
input element_type V_S[63:0]; //input 64 lines of vector data V_S
input element_type V_R[63:0]; //input 64 lines of vector data V_R
input [6:0] shift_count_0; //shift step
input [6:0] shift_count_1; //shift step
logic [6:0] pre_mux_ctrl_0[63:0];
logic [6:0] pre_mux_ctrl_1[63:0];

//generate control signals, each having a 6-bit selection control word, in which the $6^{th}$ bit is used to make a preprocessing selection
for (int i=0;i<64;i=i+1) begin
pre_mux_ctrl_0[i][6:0]=i−shift_count_0; //use borrowing to make a preprocessing selection
pre_mux_ctrl_1[i][6:0]=i−shift_count_1; //use borrowing to make a preprocessing selection
V_W[i]=pre_mux_ctrl_0[i][6] ? V_R[i]: Vs[i];
V_D[i]=pre_mux_ctrl_1[i][6] ? V_R[i]: Vs[i];
end
//generate a permutation mode, which is substantially cyclic rightward moving performed on $V_W$ and $V_D$
logic [5:0] mut_pattern_0[63:0];
logic [5:0] mut_pattern_1[63:0];
for (int i=0;i<64;i=i+1) begin
mut_pattern_0[i][5:0]=i+shift_count_0;
mut_pattern_1[i][5:0]=i+shift_count_1;
end
//serial numbers of any two adjacent elements in the output vector are certainly one odd-number serial number and one even-number serial number, and therefore, odd-number and even-number grouping may be performed on $V_W$ and $V_D$ first, and then a selection is made
for (int i=0;i<64;i=i+1) begin
V_Y[i]=V_W[mut_pattern_0[i]]; //odd-number and even-number grouping and selection are the same as those in Embodiment 2 and are not repeated herein
V_Z[i]=V_D[mut_pattern_1[i]]; //odd-number and even-number grouping and selection are the same as those in Embodiment 2 and are not repeated herein
end It should be noted that the code is merely intended to more clearly interpret the implementation principle shown in FIG. 11. In specific implementation, FIG. 11 is implemented by using a logic circuit that includes various selectors.

Figure 12:
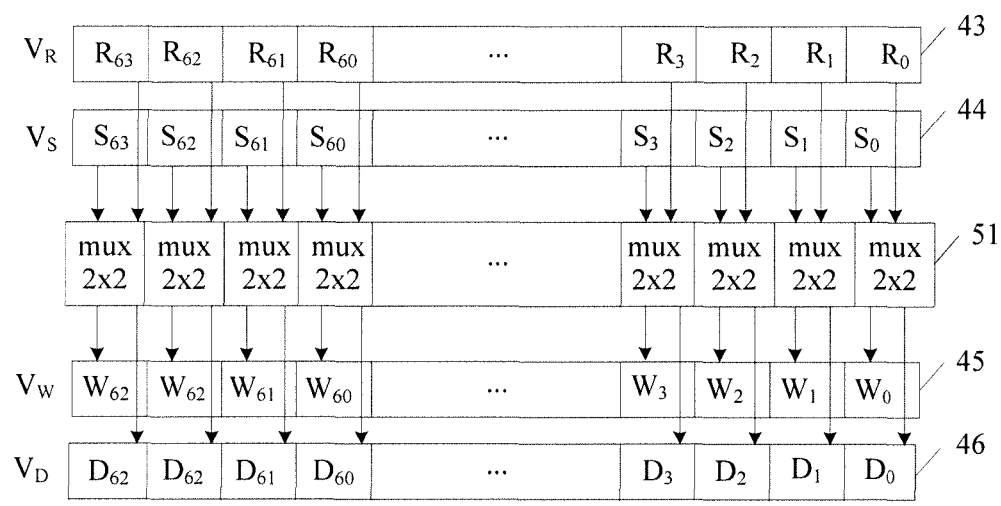
FIG. 12 is a second schematic diagram of vector data conversion according to an embodiment of the present invention.

Optionally, a preprocessing selection is made on $V_R$ (denoted by 43 in FIG. 12) and $V_S$ (denoted by 44 in FIG. 12) shown in FIG. 10, that is, the circuit in FIG. 12 may be used to convert $V_R$ and $V_S$ into $V_W$ (denoted by 45 in FIG. 12) and $V_D$ (denoted by 46 in FIG. 12). Specifically, after two elements in the same positions in 43 and 44 pass through a 2×2 crossbar (that is, 2 1-of-2 selectors, denoted by mux2×2 in FIG. 12), the two elements are output by the 2×2 crossbar, so as to implement conversion on 43 and 44, that is, convert 43 and 44 into 45 and 46 that need to be permutated. A working principle of the 2×2 crossbar in this embodiment is similar to working principles of the 2×2 crossbar in the switching unit in Embodiment 2 and Embodiment 3. Specifically, reference may be made to related description about the 2×2 crossbar in the switching unit in Embodiment 2 and Embodiment 3, and no repeated description is given herein any further.

Optionally, when making a preprocessing selection on $V_R$ and $V_S$ shown in FIG. 10, the 2×2 crossbar may make a preprocessing selection in any manner under control of the control unit (the control logic of the control unit is determined according to a preprocessing selection requirement). For example, assuming that the $0^{th}$ line of input includes two input elements: $\{R_0, S_0\}$, the 2×2 crossbar can cause the $0^{th}$ line of output to be $\{R_0, S_0\}$, $\{S_0, R_0\}$, $\{S_0, S_0\}$, or $\{R_0, R_0\}$ under control of the control unit.

Before a selection unit makes a selection on a vector data group and a switching unit switches elements in the vector data group, the vector permutation circuit provided in this embodiment of the present invention groups to-be-permutated vector data first, that is, divides the to-be-permutated vector data into n vector data groups. Therefore, in this embodiment of the present invention, for vector data that has a relatively great bit width, the vector data can be converted, by grouping, into vector data that has a smaller bit width, and be permutated. In this way, the vector permutation circuit provided in this embodiment of the present invention can still be implemented by using a crossbar, so that the crossbar can be applied to a scenario of permutating the vector data that has a relatively great bit width.

Further, compared with the prior art, the vector permutation circuit provided in this embodiment of the present invention can reduce resource consumption by 50% in a case that both can implement the three common permutation modes in FIG. 5, and the vector permutation circuit provided in this embodiment of the present invention can further reduce overheads of multiple sets of hardware resources (that is, the logic circuits enumerated in each embodiment described above) configured in the prior art to implement multiple permutation modes.

Further, the permutation modes that can be implemented by the vector permutation circuit provided in this embodiment of the present invention include but are not limited to the three common permutation modes shown in FIG. 5, that is, the vector permutation circuit provided in this embodiment of the present invention can support more permutation modes by using different preprocessing logic, different control logic, different selection units, different switching logic, and the like. Specifically, specific logic circuit setting and specific control circuit setting may be performed according to an actual use requirement, and are not limited by the present invention. Any other vector data permutation solutions based on conceptions of grouping, selection, and switching (or possibly including preprocessing before the grouping, and the like) in the present invention shall fall within the protection scope of the present invention.

An embodiment of the present invention provides a vector processor. The vector processor includes a vector permutation circuit in any one of FIG. 2 to FIG. 4, FIG. 6 to FIG. 9, and FIG. 11. Specifically, for description about the vector permutation circuit, reference may be made to detailed description about the vector permutation circuit in the embodiment shown in FIG. 2 to FIG. 4, FIG. 6 to FIG. 9, and FIG. 11.

It should be noted that apart from the three permutation modes shown in FIG. 5(a), FIG. 5(b), and FIG. 5(c) and mentioned in the foregoing embodiment, the vector processor provided in this embodiment of the present invention may also be applied to a scenario of performing other processing on the vector data, for example, performing interleaving (English: interleave) on the vector data, performing de-interleaving (English: de-interleave) on the vector data, performing packing (English: pack) on the vector data, performing unpacking (English: unpack) on the vector data, performing shifting (English: shift) on the vector data, performing duplication (English: duplication) on the vector data, and performing block permutation (English: block permutation) on the vector data.

This embodiment of the present invention provides a vector processor, where the vector processor includes a vector permutation circuit, and the vector permutation circuit includes a grouping unit, m selection units connected to the grouping unit, j switching units connected to the m selection units, and a control unit connected to each selection unit and each switching unit, where each switching unit is connected to m/j selection units, m, j, and n are all integers greater than 1, and m is an integer multiple of j and n; the grouping unit is configured to divide to-be-permutated vector data into n vector data groups, and output the n vector data groups to the m selection units, where each vector data group corresponds to at least one selection unit, and the selection units respectively corresponding to different vector data groups are different; each selection unit is configured to: under control of the control unit, select a second vector data group from a first vector data group that is input into the selection unit, and output the second vector data group to a switching unit connected to the selection unit, where the first vector data group is a vector data group in the n vector data groups; each switching unit is configured to: under control of the control unit, switch and output elements in the second vector data group that is input into the switching unit; and the control unit is configured to control each selection unit to select the second vector data group from the first vector data that is input into the selection unit, and control each switching unit to switch the elements in the second vector data group that is input into the switching unit.

Based on the foregoing technical solution, in the vector permutation circuit of the vector processor in this embodiment of the present invention, before the selection unit makes a selection on the vector data group and the switching unit switches the elements in the vector data group, the to-be-permutated vector data is grouped first, that is, the to-be-permutated vector data is divided into the n vector data groups. Therefore, in this embodiment of the present invention, for vector data that has a relatively great bit width, the vector data can be converted, by grouping, into vector data that has a smaller bit width, and be permutated. In this way, the vector permutation circuit provided in this embodiment of the present invention can still be implemented by using a crossbar, so that the crossbar can be applied to a scenario of permutating the vector data that has a relatively great bit width.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above.

In the several embodiments provided in this application, it should be understood that the described embodiments are merely exemplary. For example, division of the modules or units is not limited to division manners in the foregoing embodiments.

The units described as separate parts may be or may not be physically separate, and parts displayed as units may be or may not be physical units, that is, the separate parts may be set or selected according to an actual requirement to implement the solution in this embodiment In addition, in each embodiment of the present invention, each functional unit may be implemented by using a corresponding logic circuit. Specifically, setting may be performed according to an actual use requirement and an application scenario.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A vector permutation circuit comprising:
a grouping unit comprising fixed wiring;
m selection units comprising first selectors electrically connected to the grouping unit via the fixed wiring;
j switching units comprising second selectors electrically connected to the m selection units; and
a controller electrically connected to each selection unit and each switching unit, wherein each switching unit is connected to m/j selection units, m, j, and n are all integers greater than 1, and m is an integer multiple of j and n;
the grouping unit is configured to divide to-be-permutated vector data into n vector data groups, and output the n vector data groups directly to the m selection units by a direct electrical connection via the fixed wiring between the grouping unit and the m selection units, wherein each vector data group corresponds to at least one selection unit, and the selection units respectively corresponding to different vector data groups are different;
each selection unit is configured to: under control of the controller, select a second vector data group from a first vector data group that is input into the selection unit, and output the second vector data group to a switching unit connected to the selection unit, wherein the first vector data group is a vector data group in the n vector data groups;
each switching unit is configured to: under control of the controller, switch and output elements in the second vector data group that is input into the switching unit; and
the controller is configured to control each selection unit to select the second vector data group from the first vector data group that is input into the selection unit, and control each switching unit to switch the elements in the second vector data group that is input into the switching unit.

2. The vector permutation circuit according to claim 1, wherein each selection unit comprises f 1-of-x first selectors that are separately controlled by the controller, x=y/n, y is a bit width of the to-be-permutated vector data, both f and x are integers greater than 1, and m*f is an integer multiple of y, wherein
each of the f 1-of-x first selectors is configured to: under control of the controller, select an element from the first vector data group that is input into the 1-of-x first selector, and output the element to a switching unit connected to the 1-of-x first selector.

3. The vector permutation circuit according to claim 2, wherein each switching unit comprises k 1-of-n second selectors that are separately controlled by the controller, each of the k 1-of-n second selectors is connected to m/j 1-of-x first selectors, the m/j 1-of-x first selectors are 1-of-x first selectors in the m/j selection units connected to the switching unit, and k*j is an integer multiple of y, wherein
each of the k 1-of-n second selectors is configured to: under control of the controller, select an element from n elements that are input into the 1-of-n second selector, and output the element.

4. The vector permutation circuit according to claim 1, wherein
m=2n, and each vector data group corresponds to two selection units.

5. The vector permutation circuit according to claim 1, wherein
m=n, and each vector data group corresponds to one selection unit.

6. The vector permutation circuit according to claim 2, wherein
the controller is configured to: according to preset control logic, generate a first control signal corresponding to each 1-of-x first selector, and a second control signal corresponding to each 1-of-n second selector, and output the first control signal to the corresponding 1-of-x first selector and output the second control signal to the corresponding 1-of-n second selector;
each 1-of-x first selector is configured to: according to the first control signal that is input into the 1-of-x first selector, select an element from the first vector data group that is input into the 1-of-x first selector, and output the element to a 1-of-n second selector connected to the 1-of-x first selector; and
each 1-of-n second selector is configured to: according to the second control signal that is input into the 1-of-n second selector, select an element from n elements that are input into the 1-of-n second selector, and output the element.

7. A vector processor comprising:
a vector permutation circuit comprising:
a grouping unit comprising fixed wiring;
m selection units comprising first selectors electrically connected to the grouping unit via the fixed wiring;
j switching units comprising second selectors electrically connected to the m selection units; and
a controller electrically connected to each selection unit and each switching unit, wherein each switching unit is connected to m/j selection units, m, j, and n are all integers greater than 1, and m is an integer multiple of j and n;
the grouping unit is configured to divide to-be-permutated vector data into n vector data groups, and output the n vector data groups directly to the m selection units by a direct electrical connection via the fixed wiring between the grouping unit and the m selection units, wherein each vector data group corresponds to at least one selection unit, and the selection units respectively corresponding to different vector data groups are different;
each selection unit is configured to: under control of the controller, select a second vector data group from a first vector data group that is input into the selection unit, and output the second vector data group to a switching unit connected to the selection unit, wherein the first vector data group is a vector data group in the n vector data groups;
each switching unit is configured to: under control of the controller, switch and output elements in the second vector data group that is input into the switching unit; and
the controller is configured to control each selection unit to select the second vector data group from the first vector data group that is input into the selection unit, and control each switching unit to switch the elements in the second vector data group that is input into the switching unit.

8. The vector processor according to claim 7, wherein each selection unit comprises f 1-of-x first selectors that are separately controlled by the controller, x=y/n, y is a bit width of the to-be-permutated vector data, both f and x are integers greater than 1, and m*f is an integer multiple of y, wherein
each of the f 1-of-x first selectors is configured to: under control of the controller, select an element from the first vector data group that is input into the 1-of-x first selector, and output the element to a switching unit connected to the 1-of-x first selector.

9. The vector processor according to claim 8, wherein each switching unit comprises k 1-of-n second selectors that are separately controlled by the controller, each of the k 1-of-n second selectors is connected to m/j 1-of-x first selectors, the m/j 1-of-x selectors are 1-of-x first selectors in the m/j selection units connected to the switching unit, and k*j is an integer multiple of y, wherein
 each of the k 1-of-n second selectors is configured to: under control of the controller, select an element from n elements that are input into the 1-of-n second selector, and output the element.

10. The vector processor according to claim 7, wherein m=2n, and each vector data group corresponds to two selection units.

11. The vector processor according to claim 7, wherein m=n, and each vector data group corresponds to one selection unit.

12. The vector processor according to claim 8, wherein the controller is configured to: according to preset control logic, generate a first control signal corresponding to each 1-of-x first selector, and a second control signal corresponding to each 1-of-n second selector, and output the first control signal to the corresponding 1-of-x first selector and output the second control signal to the corresponding 1-of-n second selector;
 each 1-of-x first selector is configured to: according to the first control signal that is input into the 1-of-x first selector, select an element from the first vector data group that is input into the 1-of-x first selector, and output the element to a 1-of-n second selector connected to the 1-of-x first selector; and
 each 1-of-n second selector is configured to: according to the second control signal that is input into the 1-of-n second selector, select an element from n elements that are input into the 1-of-n second selector, and output the element.

13. The vector permutation circuit according to claim 1, wherein the grouping unit is configured to divide the to-be-permutated vector data into the n vector data groups according to odd-number serial numbers and even-number serial numbers of elements such that an odd-numbered vector data group corresponds to odd-number serial numbers and an even-numbered vector data group corresponds to even-number serial numbers.

14. The vector permutation circuit according to claim 13, wherein
 the grouping unit further comprises a register having an odd-number output pin corresponding to each odd-number serial number, and an even-number output pin corresponding to each even-number serial number, and
 the grouping unit is electrically connected to the m selections units through the fixed wiring set directly between each odd-number output pin of the first register and a corresponding selection unit, and fixed wiring set directly between each even-number output pin of the register and a different corresponding selection unit.

15. The vector permutation circuit according to claim 1, wherein
 the j switching units include a first switching unit and a second switching unit,
 the first switching unit obtains a predetermined number of least significant elements from the second vector data group to select an even element with an even-number serial number as a first output, and
 the second switching unit obtains a predetermined number of most significant elements from the second vector data group to select an odd element with an odd-number serial number as a second output.

* * * * *